(12) United States Patent
Karatsinides

(10) Patent No.: US 10,293,314 B2
(45) Date of Patent: May 21, 2019

(54) TEMPERATURE CONTROLLED ROTATING APPARATUS

(71) Applicant: Dimitri Spiro Karatsinides, Novi, MI (US)

(72) Inventor: Dimitri Spiro Karatsinides, Novi, MI (US)

( * ) Notice: Subject to any disclaimer, the term of this patent is extended or adjusted under 35 U.S.C. 154(b) by 360 days.

(21) Appl. No.: 15/226,167

(22) Filed: Aug. 2, 2016

(65) Prior Publication Data

US 2018/0036695 A1    Feb. 8, 2018

(51) Int. Cl.
| | |
|---|---|
| *B01F 9/04* | (2006.01) |
| *B01F 15/00* | (2006.01) |
| *A23L 13/40* | (2016.01) |
| *B01F 9/00* | (2006.01) |
| *B01F 9/06* | (2006.01) |
| *B01F 15/06* | (2006.01) |
| *A23L 13/70* | (2016.01) |

(52) U.S. Cl.
CPC .............. *B01F 9/04* (2013.01); *A23L 13/428* (2016.08); *A23L 13/70* (2016.08); *B01F 9/003* (2013.01); *B01F 9/0016* (2013.01); *B01F 9/0018* (2013.01); *B01F 9/06* (2013.01); *B01F 15/00175* (2013.01); *B01F 15/00396* (2013.01); *B01F 15/065* (2013.01)

(58) Field of Classification Search
CPC ........ B01F 9/04; B01F 9/0016; B01F 9/0018; B01F 9/003; B01F 15/00396; B01F 15/065
USPC ........................................................ 366/145
See application file for complete search history.

(56) References Cited

U.S. PATENT DOCUMENTS

| | | | | |
|---|---|---|---|---|
| 3,220,804 A | * | 11/1965 | Steinrotter | ............. C08G 69/04 422/199 |
| 3,863,902 A | * | 2/1975 | O'Brien | ................ B01F 9/0016 241/178 |
| 4,120,981 A | * | 10/1978 | Burkhart | ............... A47J 27/004 426/231 |
| 4,458,586 A | | 7/1984 | Reed | |
| 4,540,288 A | * | 9/1985 | Pandolfi | .................... A23G 9/12 366/145 |
| 5,724,750 A | | 3/1998 | Burress | |

(Continued)

FOREIGN PATENT DOCUMENTS

| | | |
|---|---|---|
| DE | 102009014293 A1 | 9/2010 |
| EP | 1547942 A1 | 6/2005 |

(Continued)

OTHER PUBLICATIONS

English translation of DE 102009014293 A1; downloaded from Espace.net dated Oct. 5, 2016, 20 pages.

*Primary Examiner* — Marc C Howell
(74) *Attorney, Agent, or Firm* — Howard & Howard Attorneys PLLC

(57) ABSTRACT

An apparatus is provided which comprises a barrel having a substantially cylindrical configuration. The barrel comprises an exterior surface and defines an interior volume. A base unit comprises a drive motor being configured to rotate the barrel by interfacing with the exterior surface of the barrel. The barrel comprises a thermoelectric heat pump attached thereto and being controllable for at least one of transferring heat out of the interior volume and transferring heat into the interior volume.

22 Claims, 13 Drawing Sheets

(56) References Cited

U.S. PATENT DOCUMENTS

| | | | |
|---|---|---|---|
| 6,007,418 A | 12/1999 | Suhner | |
| 6,040,013 A | 3/2000 | Karales | |
| 6,105,490 A | 8/2000 | Horn et al. | |
| 6,469,414 B2 | 10/2002 | Rehder et al. | |
| 7,007,594 B2 | 3/2006 | Thornton et al. | |
| 7,047,874 B1 | 5/2006 | Eastman, III | |
| 7,047,875 B1 | 5/2006 | Eastman, III | |
| 7,229,656 B2 | 6/2007 | Paumen et al. | |
| 7,526,879 B2* | 5/2009 | Bae | D06F 58/206 34/239 |
| 7,670,042 B2 | 3/2010 | Cheung | |
| 7,744,941 B2 | 6/2010 | Flood | |
| 2003/0085234 A1* | 5/2003 | Paumen | A47J 43/24 99/535 |
| 2005/0204749 A1 | 9/2005 | Russmann | |
| 2006/0150831 A1 | 7/2006 | Benita et al. | |
| 2008/0135126 A1 | 6/2008 | Lemme | |
| 2008/0257168 A1* | 10/2008 | Wolfe | A47J 36/165 99/348 |
| 2009/0004346 A1 | 1/2009 | Estes | |
| 2010/0178398 A1 | 7/2010 | Wai et al. | |
| 2011/0248108 A1* | 10/2011 | Carriere | A47J 43/0722 241/33 |

FOREIGN PATENT DOCUMENTS

| | | | |
|---|---|---|---|
| EP | 2924817 A1 | 9/2015 | |
| GB | 839016 A * | 6/1960 | B01F 9/0016 |

\* cited by examiner

TEMPERATURE CONTROLLED ROTATING APPARATUS

TECHNICAL FIELD

The present invention relates generally to a temperature controlled rotating apparatus.

BACKGROUND

Rotating apparatuses such as tumblers are known for purposes such as marinating food, or the like. Typically, when preparing meats for cooking, meats (or other foods) are placed into the tumbler along with some sort of marinade(s) and/or seasoning(s). The tumbler is then rotated to mix the contents therein.

Conventional tumblers cannot be used for extended periods of time because either the tumbler is not cooled or the contents of the tumbler heat up during rotation. As such, after tumbling, the tumbler and/or the contents are typically refrigerated to preserve the contents from spoiling. Conventional tumblers are often too large to fit within a refrigerator. Inconveniently, in such instances, the contents must be removed from the tumbler and placed in a separate container for refrigeration. Alternatively, the tumbler may fit inside the refrigerator. In either case, the contents remain stationary during refrigeration for many hours without being perturbed or mixed. When the time comes to obtain the contents for purposes such as cooking or the like, the marinade is found separated from the food. In turn, the contents are unevenly marinated thereby defeating the purpose of the tumbler.

To address this issue, the tumbler and/or the contents may be manually shaken. This manual strategy, however, is inconvenient and susceptible to human error. For example, the user must be physically preset to shake the contents or may forget to shake the contents.

As such, there remains an opportunity to address at least the aforementioned problems.

SUMMARY

One embodiment of an apparatus is provided. The apparatus comprises a barrel having a substantially cylindrical configuration. The barrel comprises an exterior surface and defines an interior volume. A base unit comprises a drive motor being configured to rotate the barrel by interfacing with the exterior surface of the barrel. The barrel comprises a thermoelectric heat pump attached thereto and being controllable for at least one of transferring heat out of the interior volume and transferring heat into the interior volume.

Another embodiment of an apparatus is provided. The apparatus is configured to mix food and/or liquid. The apparatus comprises a barrel having a substantially cylindrical configuration. The barrel comprises an exterior surface and an interior layer. The interior layer comprises a conductive material and defines an interior volume for housing the food and/or liquid. At least one agitator member is coupled to the interior layer for interacting with the food and/or liquid within the interior volume. A base unit comprises a drive motor being configured to rotate the barrel to mix the food and/or liquid by interfacing with the exterior surface of the barrel. The barrel comprises a thermoelectric heat pump attached thereto and being controllable for at least one of (i) transferring heat out of the interior volume for cooling the food and/or liquid and (ii) transferring heat into the interior volume for heating the food and/or liquid.

Another embodiment of an apparatus is provided. The apparatus is configured to rotate one or more containers comprising contents stored therein. The apparatus comprises a barrel having a substantially cylindrical configuration. The barrel comprises an exterior surface and an interior layer. The interior layer comprises a conductive material and defines an interior volume. At least one holder is coupled to the interior layer for holding the one or more containers within the interior volume. A base unit comprises a drive motor being configured to rotate the barrel to mix the contents of the one or more containers by interfacing with the exterior surface of the barrel. The barrel comprises a thermoelectric heat pump attached to the interior layer and being controllable for at least one of (i) transferring heat out of the interior volume through the interior layer for cooling contents of the one or more containers, and (ii) transferring heat into the interior volume through the interior layer for heating contents of the one or more containers.

Yet another embodiment of an apparatus is provided. The apparatus comprises a barrel having a substantially cylindrical configuration. The barrel comprises an exterior surface and defines an interior volume. A base unit comprises a drive motor being configured to rotate the barrel by interfacing with the exterior surface of the barrel. The barrel comprises a heating element attached thereto and being energizable to transfer heat into the interior volume.

The apparatus advantageously provides a configuration for mixing contents, such as solids and liquids, whether such solids and liquids are secured in a container in the barrel or loosely disposed inside the barrel. By interfacing with the exterior surface of the barrel, mechanically fixing to the base unit is eliminated. As such, the barrel is easily removable from and disposed on the base unit for quick operation. The barrel can be conveniently moved to a location away from the base unit. The barrel can be used for extended periods of time because the barrel is temperature controlled using the thermoelectric heat pump. The heat pump provides an efficient and compact means for heating and/or cooling the interior volume of the barrel. The heat pump provides a slim profile that can be integrated into layers of the barrel for an aesthetically pleasing appearance for the apparatus. As such, the contents can remain inside the barrel for extended periods because the barrel can be cooled to preserve the contents from spoiling. In other words, the barrel can provide refrigeration thereby reducing the need to remove the contents of the barrel or the barrel itself to a refrigerator. While cooled inside the barrel, the contents are constantly mixed or perturbed via rotation of the barrel. Thus, for example, when the time comes to obtain the contents for purposes such as cooking or the like, the contents are properly and evenly mixed. This reduces or eliminates the need for manually mixing the contents to account for settling of the liquid with conventional techniques. Those skilled in the art appreciate that the apparatus may exhibit any other advantages not specifically described herein.

BRIEF DESCRIPTION OF DRAWINGS

Advantages of the present invention will be readily appreciated as the same becomes better understood by reference to the following detailed description when considered in connection with the accompanying drawings wherein.

DETAILED DESCRIPTION

I. General Apparatus Overview

Referring to the Figures, wherein like numerals indicate like or corresponding parts throughout the several views, an apparatus is shown generally at 20. The apparatus 20 is rotatable and is configured to mix solid and/or liquid contents. Contents which may be mixed by the apparatus 20 include, but are not limited to: food products, such as meats, vegetables, etc.; consumable liquids, such as marinade(s), sauces; non-consumable liquids, such as chemicals; containers comprising solids and/or liquids; medical/scientific/laboratory related objects, such as test tubes, and the like. Additionally, the apparatus 20 may be sealed such that gasses can be mixed therein in lieu of or in addition to solids and/or liquids. Those skilled in the art appreciate that any other suitable solid(s), liquid(s), and/or gas(es) may be mixed by the apparatus 20 whether such contents are secured within a container or not.

The apparatus 20, when used for food related purposes, is generally a consumer product, such as a food tumbler, a food mixer, or a marinating apparatus. When used for medical or laboratory purposes, the apparatus 20 is understood to be medical equipment. Those skilled in the art appreciate that the apparatus 20 may be used for purposes other than food, medical or laboratory purposes depending on the contents placed therein.

Figure 1:
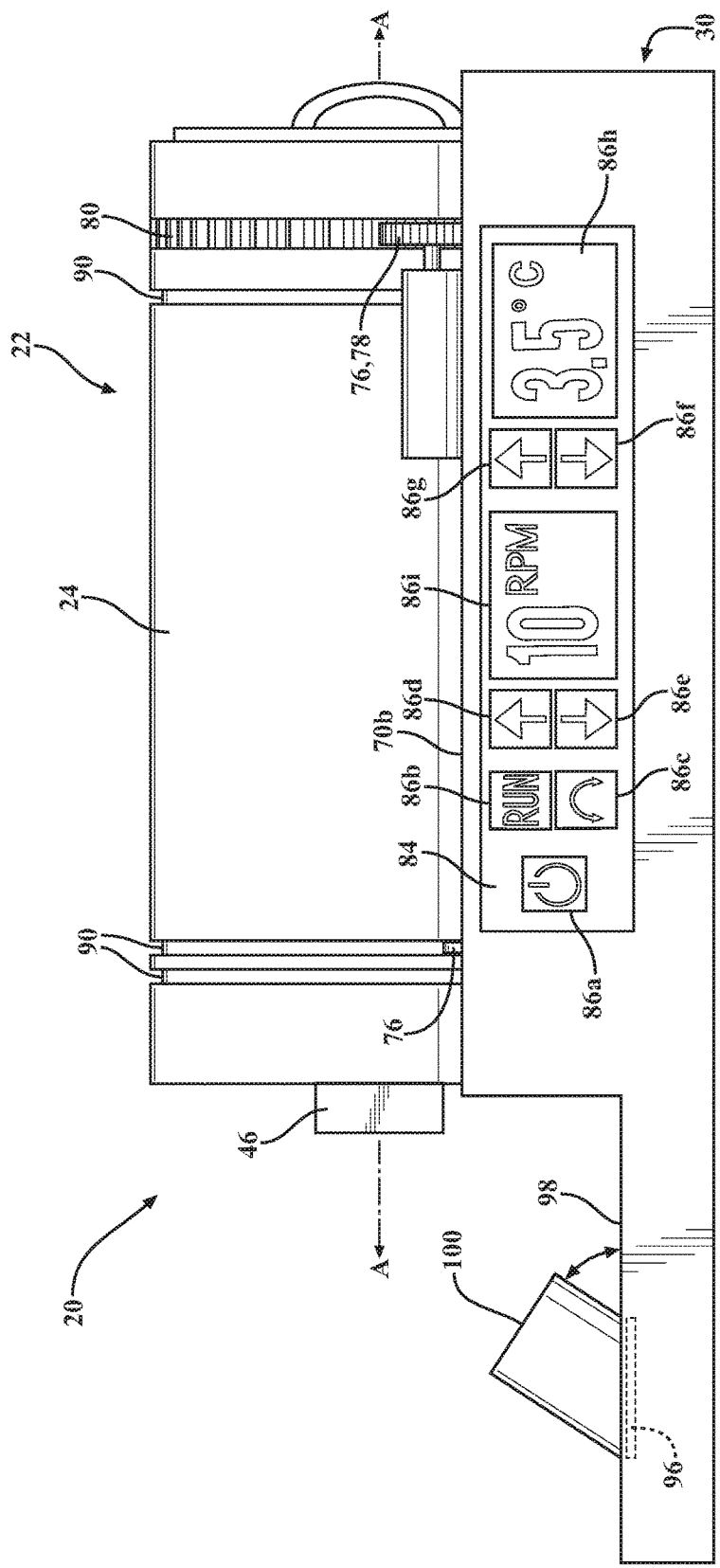
FIG. 1 is a perspective front view of an apparatus comprising a barrel that is configured to be rotated by a base unit, according to one embodiment.

As shown in FIG. 1, for example, the apparatus 20 comprises a barrel 22 having a substantially cylindrical configuration. The cylindrical configuration allows the barrel 22 to have a symmetrical configuration for rotation purposes. In one embodiment, the barrel 22 is configured to rotate on its side. In other words, an axis A is defined through the cylindrical center of the barrel 22 and the barrel 22 rotates about the axis A. The barrel 22 may have any suitable dimensions for the purposes described herein.

The barrel 22 includes an exterior layer or surface 24. The exterior surface 24 is the outer surface of the barrel 22 that is exposed and graspable (touchable) by an operator of the apparatus 20. As will be described below, the barrel 22 is rotated via interaction with the exterior surface 24. The exterior surface 24 also defines a substantially cylindrical configuration by virtue of the exterior surface 24 being part of the barrel 22. In one embodiment, the exterior surface 24 comprises a conductive material, such as conductive metal, or the like. In other embodiments, the exterior surface 24 comprises an electrically insulating material, such as plastic, dielectric material, or the like. The exterior surface 24 may have different configurations depending on various embodiments, such as those described herein.

Figure 4:
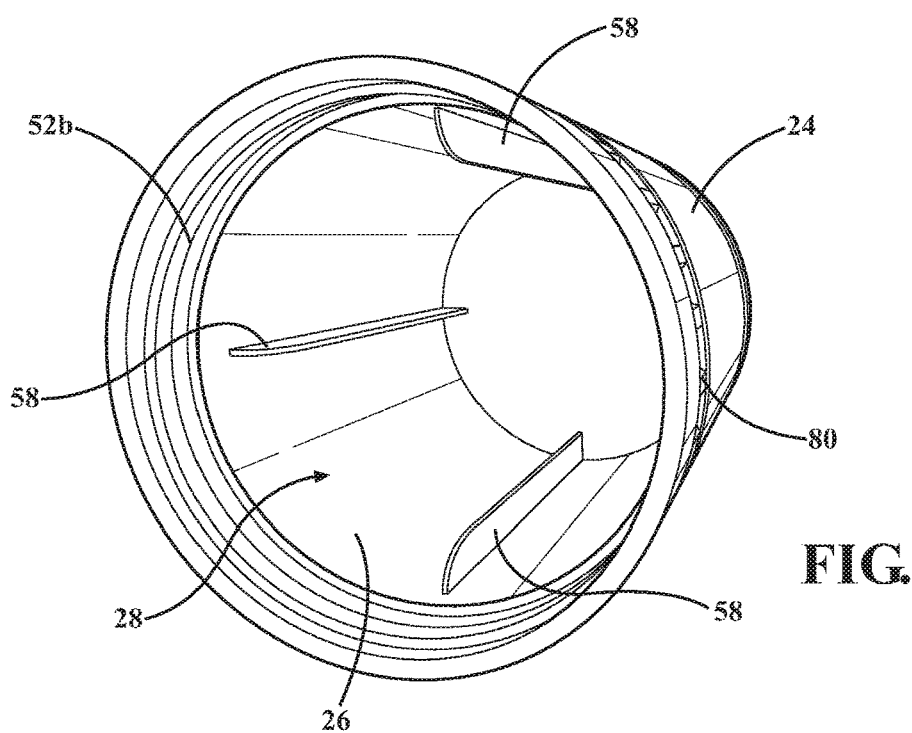
FIG. 4 is a perspective view of the barrel of FIG. 3 wherein a lid of the barrel is removed to show an interior layer and interior volume of the barrel according to one embodiment.

As best shown in FIG. 4, the barrel 22 further includes an interior layer 26. The interior layer 26 is the interior surface of the barrel 22. The interior layer 26 defines an interior volume 28 of the barrel 22. The contents are placed in the interior volume 28. In one embodiment, the interior layer 26 comprises a conductive material, such as conductive metal. The interior layer 26 may also define a substantially cylindrical configuration by virtue of the interior layer 26 being part of the barrel 22. Alternatively, the interior layer 26 may have other configurations. The interior layer 26 may have different configurations depending on various embodiments, such as those described herein.

As shown in one embodiment where the barrel 22 comprises two layers, the exterior surface 24 is generally disposed around the interior layer 26. In other words, the exterior surface 24 substantially surrounds the interior layer 26. In such embodiments, the barrel 22 comprises only two layers. Here, the interior layer 26 may be understood generally as a first layer and the exterior surface 24 may be understood as a second layer. However, as will be described below, the barrel 22 may comprise more than two layers. In one embodiment, the exterior surface 24 is the outer surface of the interior layer 26. This may be the case when the barrel 22 comprises only a single layer. Alternatively, the exterior surface 24 may be the outer surface of any other layer of the barrel 22, such as those described below.

The contents may be loosely placed in the interior volume 28 or secured within the interior volume 28. When loosely placed, the contents interact directly with and are manipulated by the interior layer 26. When secured by one or more containers, the contents may or may not interact directly with the interior layer 26. Instead, the contents will be mixed within the one or more containers via gravitational forces applied to the contents in combination with rotation of the barrel 22. Techniques for securing the contents are described in detail below.

As shown in FIG. 1, the apparatus 20 further comprises a base unit 30. The barrel 22 is disposable atop the base unit 30. The barrel 22 can be removed from the base unit 30. The base unit 30 is configured to rotate the barrel 22 about the axis A. The barrel 22 and the base unit 30 mechanically interact to allow rotation of the barrel 22. However, the barrel 22 is in a mechanically un-fixed relationship with respect to the base unit 30. Said differently, the barrel 22 preferably is not permanently fixed to the base unit 30. This configuration allows easy removal of the barrel 22 from the base unit 30 by the operator for various reasons, such as cleaning, maintenance, and/or interacting or maintaining the contents therein. For example, the barrel 22 may be removed to a location different than the location of the base unit 30 for purposes such as food-serving, or the like. The barrel 22 may be removed for various other reasons specific to the contents being mixed therein and for other reasons not specifically recited herein.

Figure 6:
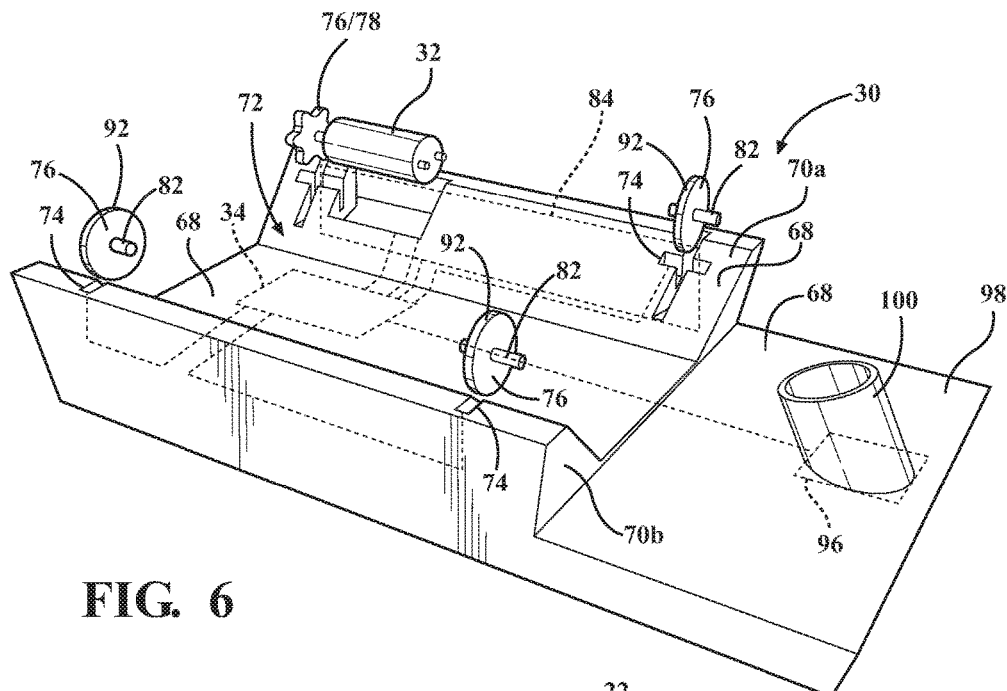
FIG. 6 is a perspective view, partially in phantom, of the base unit showing components thereof according to on embodiment.

As shown in FIG. 6, the base unit 30 comprises a drive motor 32 that is configured to rotate the barrel 22. Specifically, the drive motor 32 directly or indirectly interfaces with the exterior surface 24 of the barrel 22. The base unit 30 rotates the barrel 22 via the exterior surface 24 primarily because the barrel 22 is removable from the base unit 30. Mainly, the exterior surface 24 provides a quick interface to the base unit 30 without fixed mechanical connections. The drive motor 32 is an electric motor and may have any suitable configuration, such as a DC motor, and more specifically, a brushless or brushed DC motor, or the like. The base unit 30 may comprise any suitable number of drive motors 32.

Figure 5:
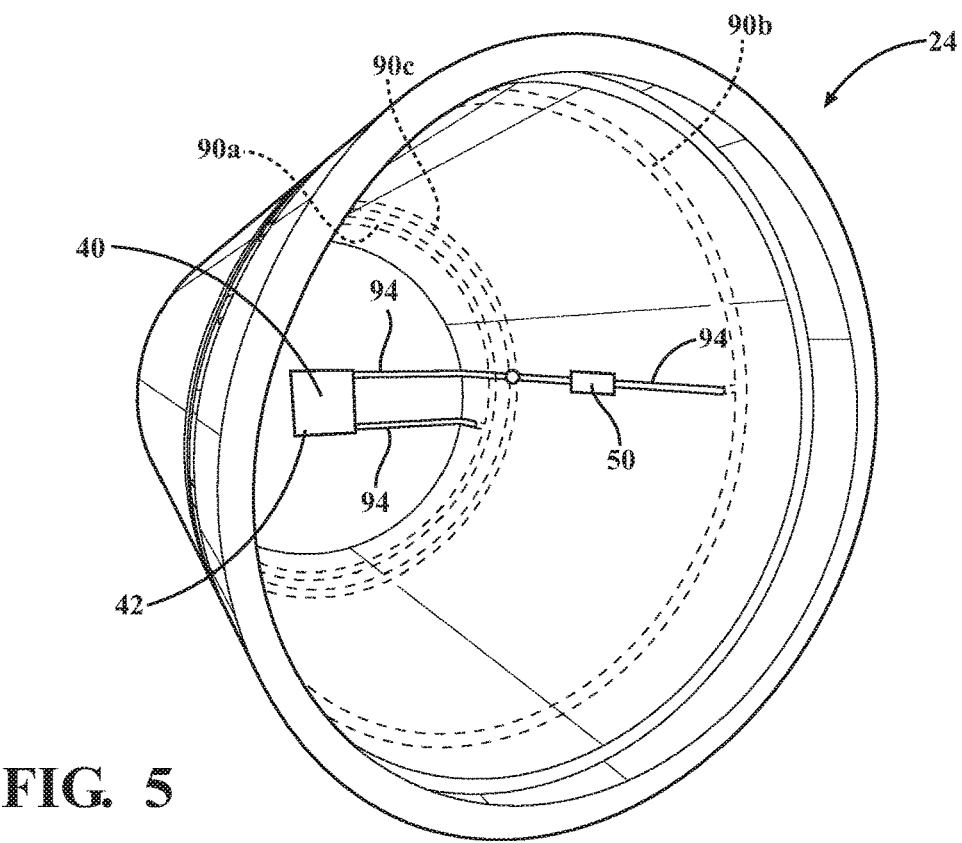
FIG. 5 is a perspective view, partially in phantom, of the barrel of FIG. 4 wherein the interior layer is remove to show a thermoelectric heat pump, temperature sensor, and conductors coupled to an inside of an exterior layer of the barrel according to one embodiment.

As shown in FIG. 5, for example, the barrel 22 comprises a thermoelectric heat pump 40 attached thereto. The thermoelectric heat pump 40 is attached to the interior layer 26. Preferably, the thermoelectric heat pump 40 is disposed in such a way so as to not physically interfere with the contents of the barrel 22. In one embodiment, as shown in FIG. 5, the thermoelectric heat pump 40 is coupled to a base 38 of the barrel 22. The thermoelectric heat pump 40 is controllable or energizable to transfer heat out of the interior volume 28 for cooling or refrigerating the contents therein. Alternatively or additionally, the thermoelectric heat pump 40 is controllable or energizable to transfer heat into the interior volume 28 for heating the contents therein. Electrical energy (voltage/current) is supplied to the thermoelectric heat pump 40 through the base unit 30. The thermoelectric heat pump 40 directly heats or cools the interior volume 28 of the barrel 22. Specifically, the thermoelectric heat pump 40 heats or cools the interior volume 28 of the barrel 22 by heating or cooling the interior layer 26. Due to the size/power/noise constraints, the apparatus 20 employs thermoelectric heat pump 40 instead of other types of cooling mechanisms, such as vapor or liquid compression heating and cooling units.

In one embodiment, the base unit 30 controls operation of the thermoelectric heat pump 40. Specifically, the base unit 30 may comprise one or more controllers 34 housed therein and being electrically coupled to the thermoelectric heat pump 40. Alternatively or additionally, the one or more controllers 34 may be disposed in or attached to the barrel 22. The apparatus 20 may comprise any suitable number of controllers 34. In one embodiment, the controller 34 is a microcontroller, such as a PCB mounted microcontroller, or the like. As will be described below, the controller 34 performs several operations, such as controlling or interfacing with the thermoelectric heat pump 40, the drive motor 32 and a temperature sensor 50, performing diagnostic checks, and controlling heat management device(s), such as a blower motor/fan. Such additional structures and functions of the controller 34 are described in detail below.

The barrel 22 is temperature controlled via control of the thermoelectric heat pump 40. As will be described below, depending on the polarity the voltage supplied to the thermoelectric heat pump 40, the thermoelectric heat pump 40 can be used for heating and/or cooling the interior volume 28 of the barrel 22. Thus, although the term "heat" is to describe the thermoelectric pump 40, it is to be appreciated that the thermoelectric heat pump 40 may be used for transferring heat in one direction (to cool) and an opposite direction (to heat). The thermoelectric heat pump 40 may also be referred to as a Peltier device, Peltier heat pump, thermoelectric cooler (TEC), or the like. In one embodiment, the thermoelectric heat pump 40 is a solid-state active heat pump.

II. Thermoelectric Heat Pump

The thermoelectric heat pump 40 may have several different configurations. In one embodiment, the thermoelectric heat pump 40 comprises a first side 42 and an opposing second side 44. The first side 42 may comprise the same material as the second side 44 or a different material than the second side 44. For example, the first and/or second sides 42, 44 may comprise ceramic, or the like. The thermoelectric heat pump 40 uses Peltier (thermoelectric) effect to create a heat flux between a junction of the sides 42, 44. Semiconductors are disposed between the sides 42, 44. The semiconductors may have differing electron densities. In one example, n-type and p-type semiconductors are placed in an alternating and thermally parallel configuration with respect to one another. The semiconductors are electrically connected in series.

When DC electricity flows through the thermoelectric heat pump 40, heat is transferred from one side 42, 44 to the other side 42, 44, or vice versa. The heat transfer occurs across the junctions of the semiconductors. This way, as one side 42, 44 cools the other side 42, 44 heats. As described below, the heated one of the sides 42, 44 may be attached to a heat sink 46 such that the heated one of the sides 42, 44 generally rises above ambient temperature as the cooled side 42, 44 falls below ambient temperature. The heat sink 46 is a passive heat exchanger that transfers the heat generated by the thermoelectric heat pump 40 to ambient air. The heat is dissipated away from the barrel 22 thereby allowing regulation of the interior volume 28 temperature. The heat sink 46 configurations will be described in detail below.

Figures 11, 12:
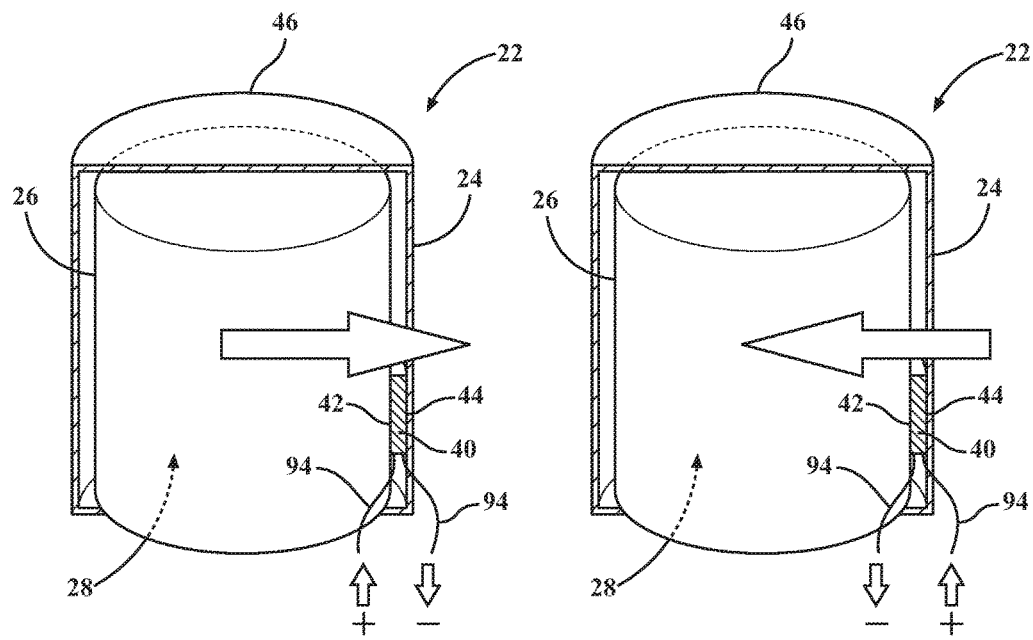
FIG. 11 is a cross-sectional view of the barrel according to one embodiment showing heat transfer in a first direction (out of the barrel) in response to energizing the thermoelectric heat pump according to a first polarity.
FIG. 12 is a cross-sectional view of the barrel according to another embodiment showing heat transfer in a second direction (into the barrel) in response to energizing the thermoelectric heat pump according to a second polarity.
Figures 13, 14:
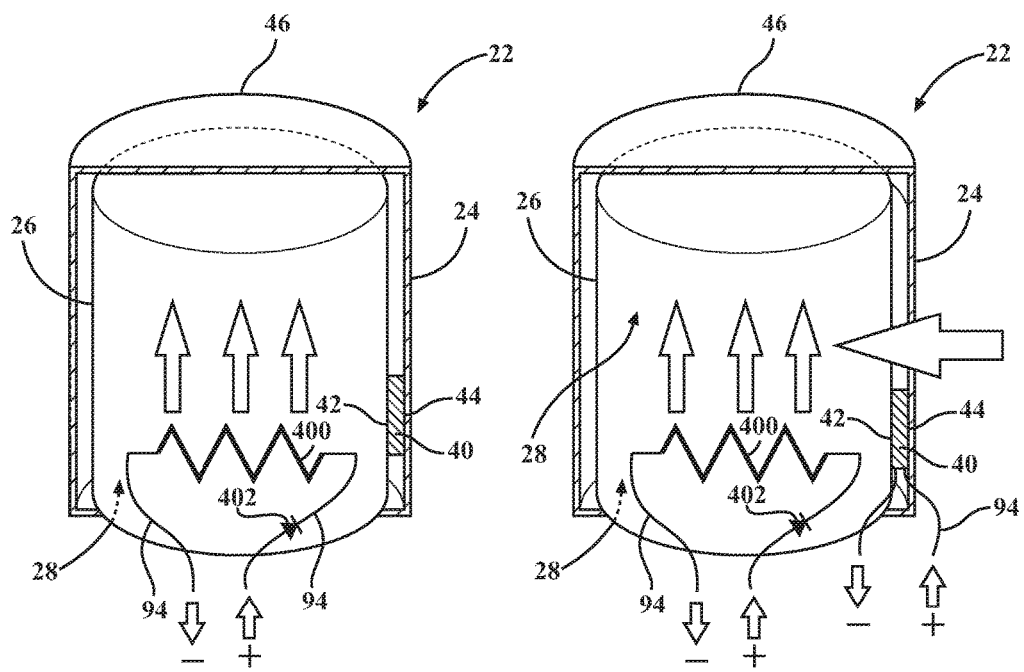
FIG. 13 is a cross-sectional view of the barrel according to another embodiment showing heat transfer into the barrel in response to energizing a heating element coupled to the barrel.
FIG. 14 is a cross-sectional view of the barrel according to another embodiment showing heat transfer into the barrel in response to energizing the heating element and the thermoelectric heat pump.

To illustrate more specifically, FIG. 11 shows the example where the thermoelectric heat pump 40 is used to cool the interior volume 28 of the barrel 22. Current (+) is applied in a first direction, e.g., to the left electrical contact which is connected to one side 42, and heat is pumped from the interior volume 28, through the thermoelectric heat pump 40, to the second side 44. The second side 44 is connected to the heat sink 46, which in this embodiment is implemented by the exterior surface 24. Heat is transferred (shown by the arrow) to the heat sink 46 and then vented to the ambient air. The thermoelectric heat pump 40 and heat sink 46 as shown in FIG. 11 are provided for illustrative purposes and may have different configurations as shown.

FIG. 12, shows the example where the thermoelectric heat pump 40 is used to heat the interior volume 28 of the barrel 22. Opposite to FIG. 11, in FIG. 12, current (+) is applied in a second direction opposite to the first direction, e.g., to the right electrical contact which is connected to other side 44, and heat is taken from ambient air, pumped from the heat sink 46, through the thermoelectric heat pump 40, and transferred into the interior volume 28 of the barrel 22.

The barrel 22 may comprise any suitable number of thermoelectric heat pumps 40. For example, the thermoelectric heat pumps 40 may be placed at different locations with respect to the interior layer 26. Additionally or alternatively, multiple thermoelectric heat pumps 40 may be cascaded together to amplify the heating/cooling effect. Furthermore, the thermoelectric heat pump 40 may have any suitable geometry and/or configuration.

III. Barrel Temperature Sensor

As shown in FIG. 5, the barrel 22 may comprise a temperature sensor 50. The temperature sensor 50 is configured to detect a temperature within the barrel 22. The temperature is generally generated as a result of the thermoelectric heat pump 40. As such, the temperature sensor 50 operates in conjunction with the thermoelectric heat pump 40 to control temperature of the interior volume 28 of the barrel 22. Generally, the temperature sensor 50 is affixed to the interior layer 26. In one embodiment, the temperature sensor 50 is disposed between the interior layer 26 and the exterior surface 24. In one example, the temperature sensor 50 detects the surface temperature of the interior layer 26. In another example, the temperature sensor 50 detects the temperature of the interior volume 28 of the barrel 22. Preferably, the temperature sensor 50 is placed in such a way so as to not physically interfere with the contents of the barrel 22.

As will be described below, the temperature sensor 50 is in communication with the controller 34. The controller 34 receives signals from the temperature sensor 50. Again, the controller 34 may be disposed in the base unit 30 and/or the barrel 22. The signals are indicative of the temperature within the barrel 22. The signals may be in any suitable analog or digital form. The controller 34 may convert and/or analyze the signals to arrive at the detected temperature using any suitable means, such as an analog to digital converter, or the like. Based on the detected temperature, the controller 34 may control or command the thermoelectric heat pump 40. For example, as described below, the controller 34 may control the thermoelectric heat pump 40 based on the detected temperature to reach or maintain a desired temperature set by an operator. Alternatively, the controller 34 may control the thermoelectric heat pump 40 based on the detected temperature according to a predetermined temperature program or algorithm. In one embodiment, the controller 34 detects discrete measurements of the temperature sensor 50 for control. Alternatively or additionally, the controller 34 detects continuous measurements of the temperature sensor 50 and determines an average detected temperature over time.

The temperature sensor 50 may have any suitable configuration, such as a thermistor (such as a PTC or NTC type), a thermocouple, a semi-conductor based temperature sensor, and the like. For thermistor embodiments, the temperature sensor 50 may have variable resistance values (in Ohms) each corresponding to a temperature measured by the sensor 50. The controller 34 is configured to measure the resistance to determine a corresponding temperature for the barrel 22. The values may be stored in memory in the base unit 30 and may be accessible by the controller 34 to make such determinations.

The barrel 22 may comprise any suitable number of temperature sensors 50. For example, the temperature sensors 50 may be disposed through various locations of the interior layer 26, or the like.

IV. Barrel Configurations

The barrel 22 may have any suitable dimension given the intended use of the barrel 22. When used for mixing food and/or liquid, for example, the barrel 22 is configured to be handled by a consumer and placed in a consumer setting, such as a kitchen countertop, or the like. For such uses, the barrel 22 size should be manageable. For example, a length of the barrel 22 along the axis A (as measured by the exterior surface 24) according to one embodiment is between 300-400 mm. A diameter of the barrel 22 measured perpendicularly with respect to the axis A (as measured by the exterior surface 24) may be between 200-300 mm according to one embodiment. Those skilled in the art appreciate that the length and diameter of the barrel 22 may have other suitable dimensions other than the dimensions described herein. Additionally, the barrel 22 as shown in the Figures may not necessarily be to scale.

As described above, the barrel 22 comprises a first (interior) layer 26 and an exterior surface or layer 24. However, the barrel 22 may comprise any suitable number of layers having various configurations. In one alternative embodiment, the barrel 22 comprises a first interior layer 26 that is comprised of conductive material, and an intermediate (second) layer 66 comprised of insulating material, and a third layer, which is the exterior surface 24 being comprised of conductive material. As such, the intermediate layer 66 is disposed between the interior layer 26 and the exterior surface 24. In such configurations, the thermoelectric heat pump 40 is disposed in the intermediate layer 66 because the intermediate layer 66 is insulating. One side 42 of the thermoelectric heat pump 40 is disposed adjacent to the interior layer 26 and the other side 44 of the thermoelectric heat pump 40 is disposed adjacent to the exterior surface 24. By doing so, the exterior surface 24, as a whole, operates as the heat sink 46. That is, because the exterior surface 24 is conductive, heat is pumped to the exterior surface 24 then vented to the ambient air for cooling the interior volume 28 and heat is taken from ambient air, pumped from the exterior surface 24, through the thermoelectric heat pump 40, and transferred into the interior volume 28 of the barrel 22 for heating the interior volume. It is to be appreciated that any layers of the barrel 22 other than the exterior surface 24, such as the intermediate layer 66, may be conductive and may be coupled to one of the sides 42, 44 of the thermoelectric heat pump 40 to operate as the heat sink 46.

Figure 2:
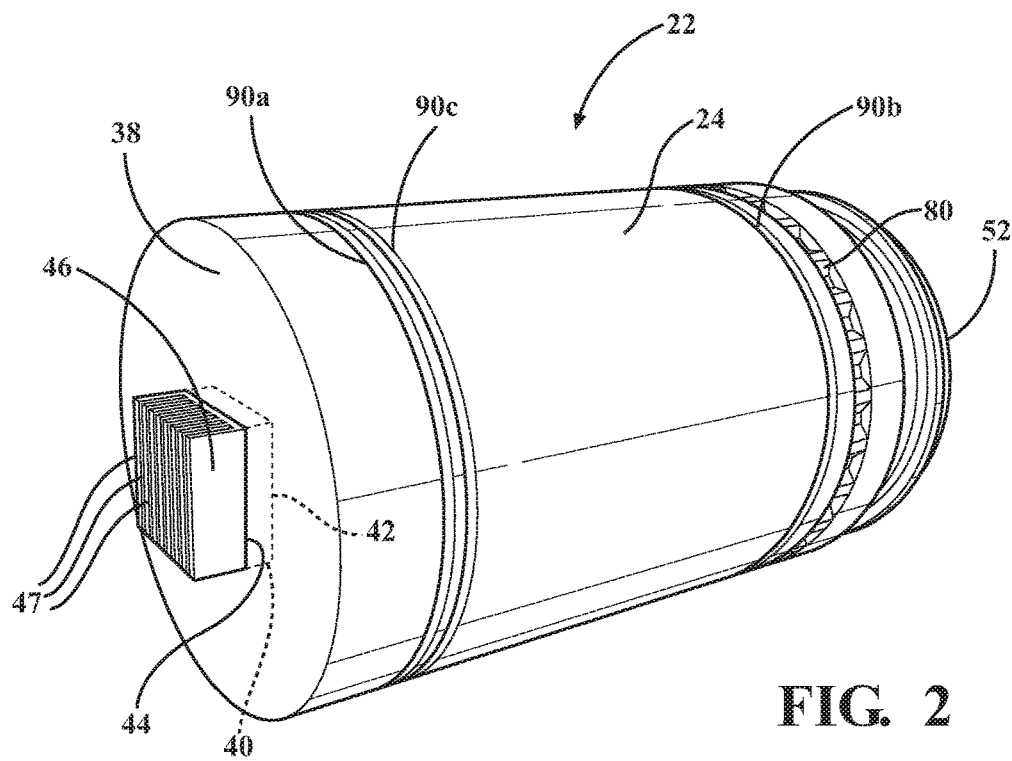
FIG. 2 is a rear perspective view of barrel according to one embodiment.

In alternative embodiments, the barrel 22 may be equipped with the heat sink 46 that is a separate unit that may be coupled to the barrel 22, and more specifically, the thermoelectric heat pump 40. One example of such a configuration is shown in FIG. 2. Here, the heat sink 46 is a unit disposed at the base 38 of the barrel 22 so as to not interfere with rotation of the barrel 22 on the base unit 30. The heat sink 46 unit may be disposed on any suitable layer of the barrel 22, such as a conductive layer or insulating layer as described herein. In one example, the heat sink 46 is disposed on the exterior surface 24 having an insulating configuration. The heat sink 46 unit may have any suitable configuration. In one embodiment, as shown, the heat sink 46 unit comprises a plurality of fins 47 vertically aligned adjacent to one another. The fins 47 are spaced according to distance suitable for allowing sufficient air flow between them.

Figure 10:
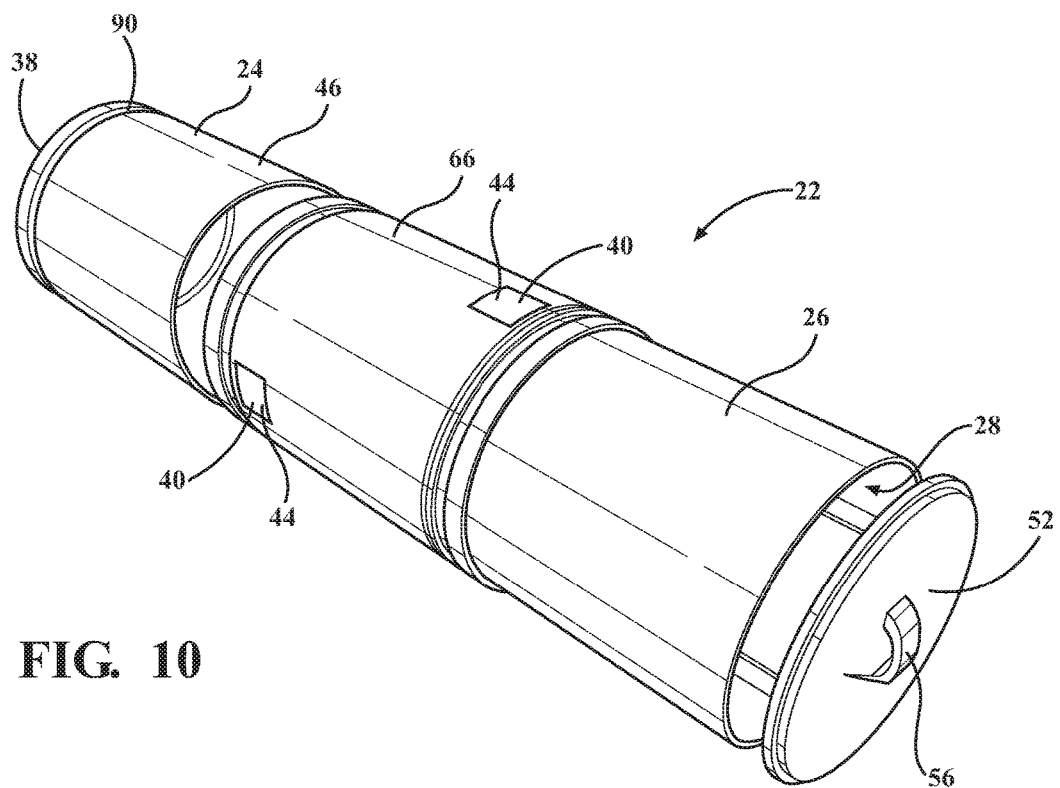
FIG. 10 is an exploded view of the barrel showing an exterior layer, intermediate layer, and interior layer, according to one embodiment.

In one embodiment, the heat sink 46 unit is a substitute for the conductive exterior surface 24 in the embodiment of FIG. 10, for example. Alternatively, the heat sink 46 unit may be utilized in conjunction with the heat sink 46 implemented by the exterior surface 24. Any suitable number of heat sink 46 units may be employed by the barrel 22. Additionally, the heat sink 46 units may be disposed at any suitable location of the barrel 22 other than the base 38.

In some instances, as described above, the barrel 22 may comprise the controller 34. The controller 34 in the barrel 22 may be in lieu of or in addition to the controller 34 in the base unit 30. The controller 34 may be disposed on and/or attached to any suitable layer of the barrel 22, such as the intermediate layer 66, exterior surface 24, or the like. In one embodiment, the controller 34 on the barrel 22 includes a substantially flat profile for maintaining the aesthetic appeal of the barrel 22.

The controller 34 in the barrel 22 may be connected to the thermoelectric heat pump 40 and the temperature sensor 50. This controller 34 may be configured to command the thermoelectric heat pump 40 with respect to programmed setpoint temperature(s). In certain instances, the base unit 30 may retain most of the functionality described herein. However, in such embodiments, because the controller 34 is in the barrel 22, there may be no need for direct electrical connection between the base unit 30 and the barrel 22 when the barrel 22 is disposed thereon. In one example, the controller 34 in the base unit 30 is configured with control logic for making determinations about whether the barrel 22 is disposed on the base unit 30. Such determinations may be made, for example, from control logic related to control of the thermoelectric heat pump 40. For instance, the base unit 30 may continuously monitor electrical current or current consumption occurring from the thermoelectric heat pump 40. When changes in current are detected, the base unit 30 controller 34 may determine that the thermoelectric heat pump 40 has been activated by the other controller 34 in the barrel 22. In response, the base unit 30 may perform any of the control functions described herein with the understanding that the barrel 22 is disposed thereon. Additionally or alternatively, in such embodiments, the controller 34 in the base unit 30 may communicate with the controller 34 in the barrel 22 using any suitable wireless or contactless transmission techniques, such as those described herein.

Figure 3:
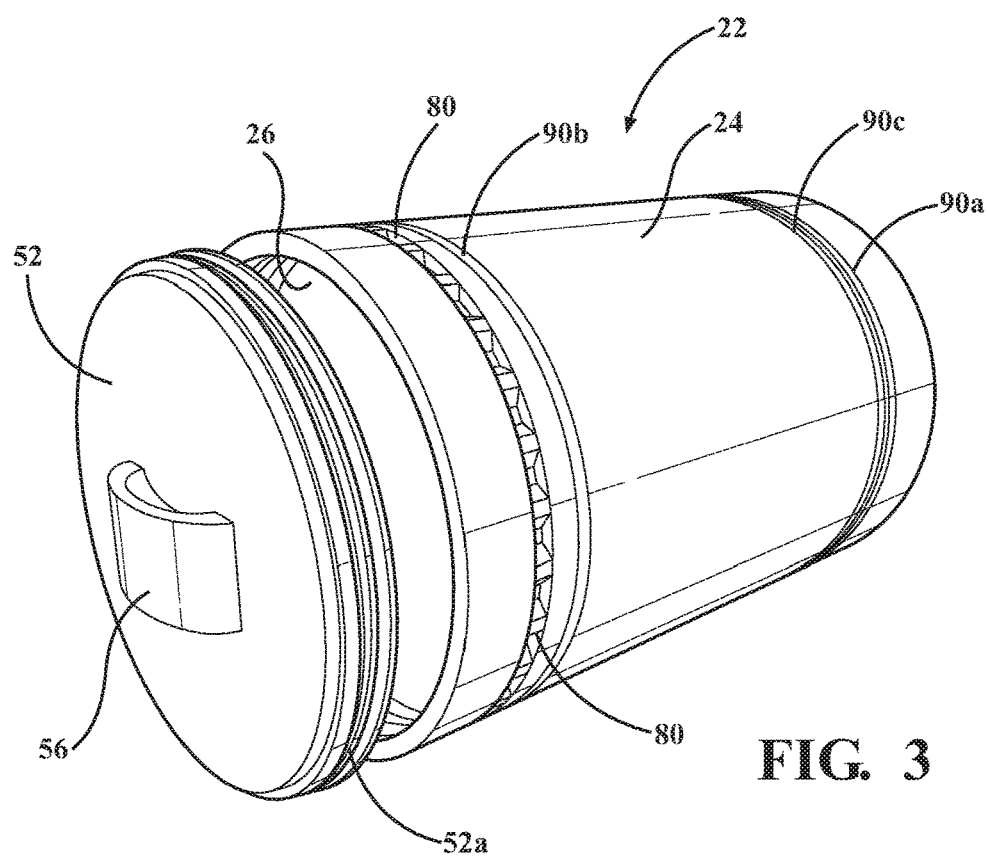
FIG. 3 is a front perspective view of the barrel of FIG. 2.

As shown in FIG. 3, for example, the barrel 22 comprises a lid 52. The lid 52 seals the contents of the barrel 22. Specifically, the lid 52 seals the interior volume 28 of the barrel 22. In one embodiment, the lid 52 comprises a threaded portion 52*a* and is screwed into the barrel 22. The barrel 22 may be also configured with a threaded portion 52*b* corresponding to the threaded portion of the lid 22. The threaded portion 52*b* may be defined in any suitable portion of the interior layer 26, exterior surface 24, or the like. The lid 52 may comprise a handle 56 coupled thereto to allow manipulation or rotation of the lid 52 for attachment to the barrel 22. The handle 56 may also serve to assist in lifting the entire barrel 22 when the lid 52 is attached thereto. Additionally, the lid 52 prevents energy (heat) from exiting the interior volume 28 of the barrel 22 to enable predictable temperature control of the barrel 22. In one embodiment, the lid 52 is comprised of an insulating material, such as plastic, to prevent heat loss through the lid 52. Those skilled in the art appreciate that the lid 52 may have any suitable configuration other than described herein and shown in the figures. Furthermore, the handle 56, if present, may be provided on any suitable portion of the barrel 22 other than the lid 52.

The interior layer 26 may have various configurations and may be equipped with different structural features given the specific use of the barrel 22. For example, as shown in FIG. 4, where the barrel 22 is used for mixing unsecured solids and liquids within the interior volume 28, the interior layer 26 may include one or more agitator members 58. Examples of the agitator members 58 include shelves, fins, blades, and the like. The agitator members 58 may be modular components that are selectively removable from the interior volume 28 depending on the application. The agitator members 58 are coupled to the interior layer 26 for interacting with the food and/or liquid within the interior volume 28. For example, when the barrel 22 is rested on the base unit 30, as shown in FIG. 1, the food and/or liquid generally rests at the bottom of the interior layer 26 which is closest to the base unit 30 by virtue of gravity. As the barrel 22 rotates via the base unit 30, the agitator members 58 drag the food and/or liquid in a direction corresponding to the axis A of rotation of the barrel 22. This causes the food and/or liquid to be mixed together and prevents the same from settling and remaining undisturbed at the bottom of the interior layer 26. The agitator members 58 may be comprised of the same material as the interior layer 26 or may be comprised of a different material. The agitator members 58 may be disposed according to any suitable configuration within the barrel 22. Additionally, all elements of the agitator members 58 may be flat and coplanar, or the agitator members 58 may be curved, twisted, or the like. Those skilled in the art appreciate that the agitator members 58 may have any other suitable configuration other than described herein and shown in the figures.

Figure 15:
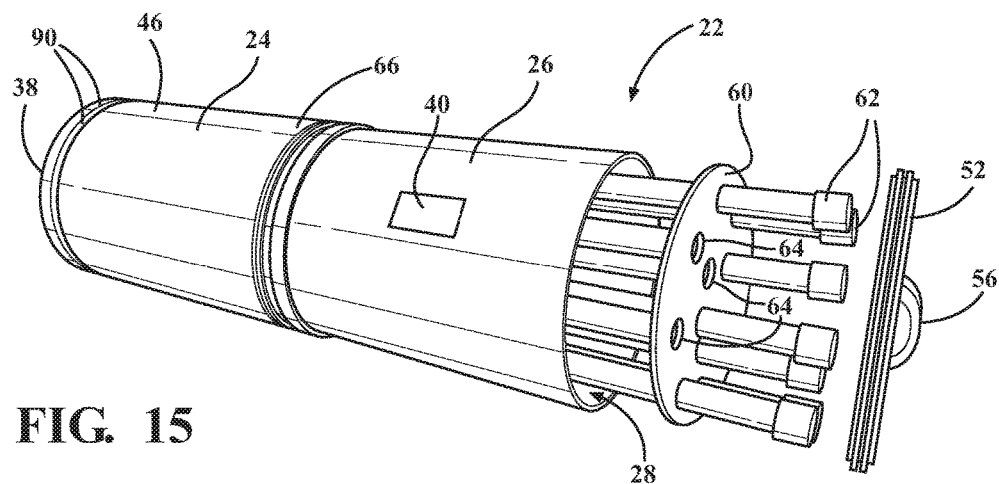
FIG. 15 is an exploded view of the barrel showing the exterior layer, an intermediate layer, and the interior layer, according to another embodiment comprising a holder for holding containers comprising contents for mixing.
Figure 16:
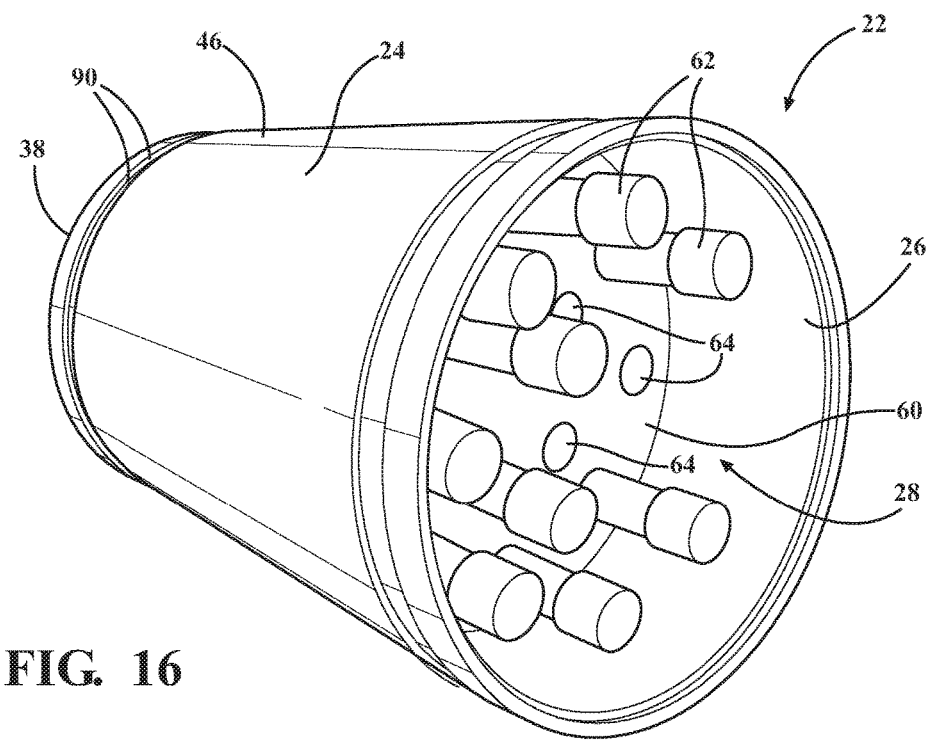
FIG. 16 is a perspective front view of the barrel of FIG. 15.

In other embodiments wherein the apparatus 20 is used for other purposes such as medical/laboratory/scientific purposes, the barrel 22 may be configured differently. For example, as shown in FIGS. 15 and 16, the interior layer 26 may comprise a holder 60 disposed in the interior volume 28. Specifically, the holder 60 may be for holding a plurality of test tubes 62. The holder 60 may be coupled to the interior layer 26. The holder 60 may be a modular component that is selectively removable from the interior volume 28 depending on the application. Here, the test tubes 62 are manually placed within a plurality of apertures 64 defined by the holder 60. In one embodiment, the holder 60 comprises one or more plates having the apertures 64 defined therein. For example, the holder 60 may comprise two plates having the apertures 64 aligned between the two plates such that the test tubes 62, when inserted, extend through both plates. When the holder 60 is present, there is generally no need for agitator members 58 because the contents being mixed are secured within the test tubes 62. Instead, the contents of the test tubes 62 are mixed within the test tubes 62 themselves by virtue of rotation of the barrel 22.

The holder 60 may be comprised of any suitable material. Furthermore, the holder 60 may secure any suitable other containers besides test tubes 62 whereby the contents subject to mixing are secured within the containers. The containers may have any suitable configuration other than tubes. Furthermore, the holder 60 may have any other suitable configuration other than those described herein and shown in the Figures.

V. Base Unit Configurations

Figure 8:
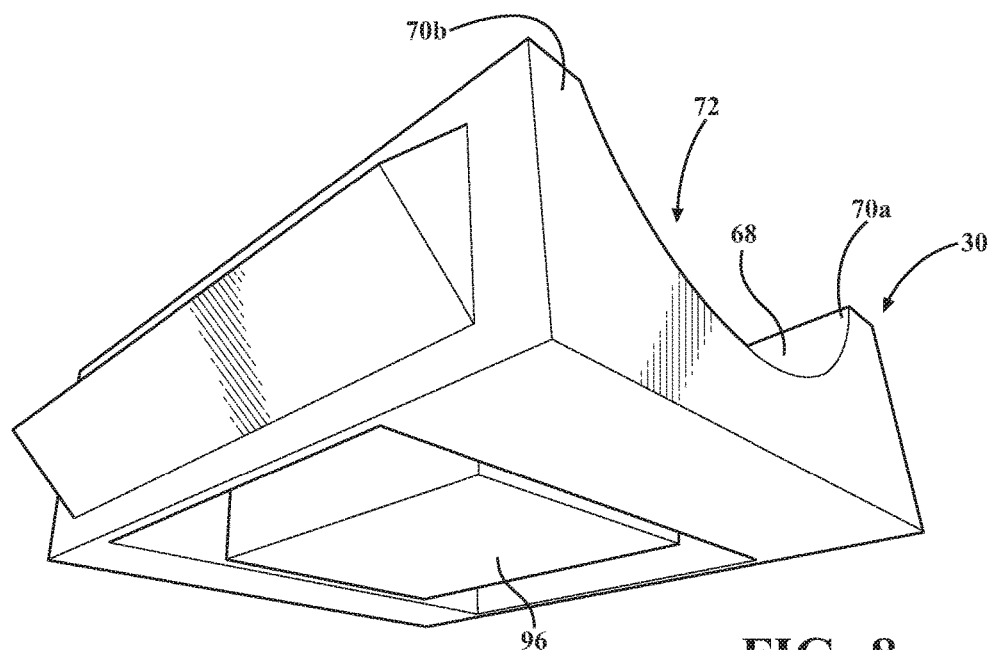
FIG. 8 is a perspective bottom view of the base unit of the embodiment of FIG. 7.
Figure 9:
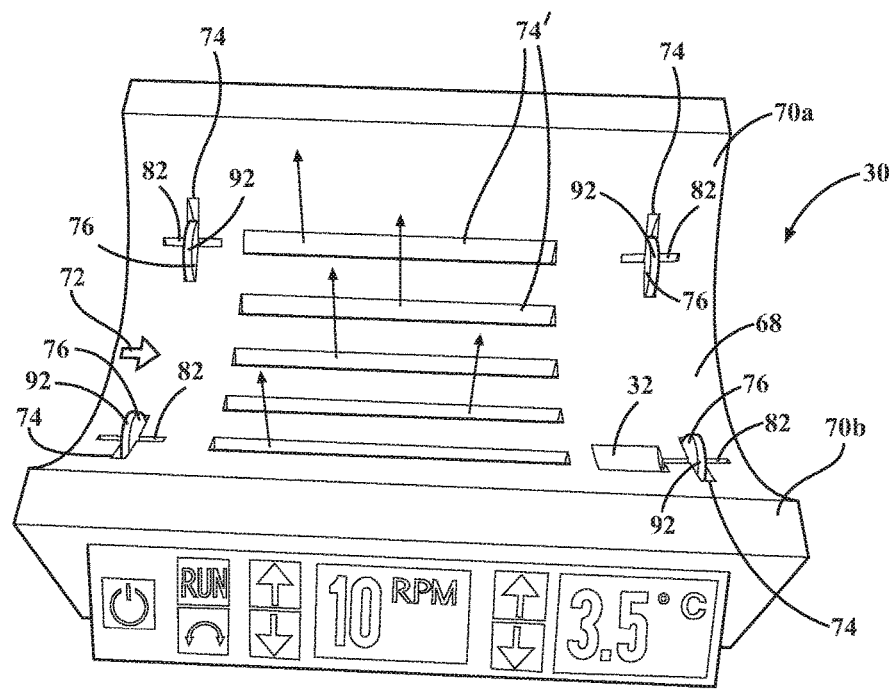
FIG. 9 is a perspective top view of the base unit of the embodiment of FIG. 8.

The base unit 30 may have any suitable configuration for supporting the barrel 22 and for providing electrical and mechanical interaction to the barrel 22 and components of the barrel 22. In some embodiments, as shown in FIGS. 6, 8 and 9, the base unit 30 generally comprises a rectangular footprint and defines an upper face 68 which interfaces with the exterior surface 24 of the barrel 22. In one embodiment, the footprint of the base unit 30 is sized to correspond to the length and diameter of the barrel 22. However, the footprint may be larger or smaller than the barrel 22 if needed.

In one example, as shown, the base unit 30 comprises portions 70a, 70b which extend vertically from a bottom of the base unit 30. These portions 70a, 70b define part of the upper face 68 and are configured to create a valley or cavity 72 for accommodating the curvature of the barrel 22 when the barrel 22 is disposed sideways thereon. The portions 70a, 70b may define a multi-sided cavity 72 as shown in FIG. 6, a parabolic (semi-cylindrical) cavity 72 as shown in FIGS. 8 and 9, or the like. The exterior surface 26 may or may not touch the portions 70a, 70b during rotation of the barrel 22. As will be described below, components of the base unit 30 may elevate the barrel 22 above the upper face 68.

The base unit 30 may comprise of any suitable material. In one embodiment, the base unit 30 comprises an insulting material, such as plastic, or the like. Additionally, the base unit 30 and portions 70a, 70b may comprise any suitable dimensions. In one example, the portions 70a, 70b are 10 cm tall as measured from the bottom of the base unit 30.

On the upper face 68, the base unit 30 may comprise openings 74 defined therein for accommodating one or more rotational members 76. In one embodiment, the rotational members 76 are wheels. However, the rotational members 76 may be any suitable component for supporting rotation of the barrel 22. In one example, the rotational members 76 each define one or more pins 82 that are disposed at the radial center of each rotational member 76. The openings 74 may be further defined to accommodate the pins 82. Support members may be disposed within the base unit 30 adjacent the openings 74 for supporting the rotational members 76, and more specifically, the pins 82 if provided. When rested in the base unit 30, each rotational member 76 generally protrudes from the upper surface 68. As such, the rotational members 76 interact directly with the exterior surface 24 of the barrel 26 and hold the barrel 22 up off the upper face 68 of the base unit 30. In one embodiment, the base unit 30 comprises four rotational members 76 each disposed at a relative corner of the upper face 68. Such configurations provide even support of the barrel 22 off the upper face 68. However, any suitable number of rotational members 76 may be provided. For example, the base unit 30 may comprise only one rotational member 76 that is elongated and extends along a substantial majority of the length of the barrel 22. Additionally, the rotational members 76 may be disposed at any suitable location on the base unit 30 and/or upper face 68.

In one embodiment, any one or more of the rotational members 76 are mechanically passive. That is, such rotational members 76 are able to freely rotate, but are not actively driven by the drive motor 32. In such embodiments, the base unit 30 directly rotates the barrel 22 via one or more driven mechanical components and the rotational members 76 passively support such rotation. For example, in one embodiment, as shown in FIG. 6, the base unit 30 comprises a gear 78 which is coupled directly to the drive motor 32 and driven by the drive motor 32. In such configurations, the barrel 22 may comprise drive wheel 80 comprising a corresponding strip of teeth and which is disposed about the circumference of the barrel 22, as shown in FIG. 3, for instance. The drive wheel 80 effectively defines a second gear on the barrel 22. As such, the drive wheel 80, in one embodiment, comprises a portion of the exterior surface 24 which is interfaced for rotation of the barrel 22. The drive wheel 80 may be defined into the exterior surface 24 or may penetrate deeper layers, such as the intermediate layer 66. Alternatively, the drive wheel 80 may protrude from the exterior surface 24. Either way, the gear 78 directly and mechanically engages the drive wheel 80 in a meshed fashion. The gear 78 exerts torque onto the teeth of the drive wheel 80 to rotate the barrel 22 in any suitable direction (clockwise or counterclockwise). The gear 78 may be equipped with a high-friction material, such as rubber, on the surface of the gear 78 that interacts with the drive wheel 80 to ensure proper torque transmission. The gear 78 may have any suitable gear ratio with respect to the drive wheel 80. However, the gear 78 is generally smaller than the drive wheel 80 and will rotate much faster than the barrel 22 to maintain a practical size of the gear 78, and the like. The drive wheel 80 may have any suitable configuration for allowing engagement with the exterior surface 24 of the barrel 22. For example, the drive wheel 80 may comprise any suitable frictional material, such as rubber, or the like. In such configurations the gear 78 may be instead any suitable wheel comprising a material for engaging the frictional material of the drive wheel 80. For example, the wheel (substituting for the gear 78) may also comprise rubber or any surface having adequate friction such that neither the drive wheel 80 or the wheel in the base unit 30 comprise gears.

Furthermore, the axial position of the drive wheel 80 may be axially centered such that the barrel 22 may rotate regardless of the orientation of the barrel 22 when disposed on the base unit 30. Alternatively, the drive wheel 80 may be located in such a position so as to ensure that the barrel 22 is disposed in only one desired orientation for various reasons, such as electrical connections, or the like, as will be described below.

In alternative embodiments, one or more of the rotational members 76 are each actively and mechanically driven by the drive motor 32. In such embodiments, the base unit 30 directly rotates the barrel 22 via the rotational members 76. The rotational members 76 may be each driven by the same drive motor 32. Alternatively, the rotational members 76 may be driven by separate and dedicated drive motors 32 that are synchronized. Those skilled in the art appreciate that the rotational members 76, gear 78, and drive wheel 80 may have any suitable configuration for enabling rotation of the barrel 22. Additionally, such components may have a design that is different than that shown in the figures without departing from the scope of the invention.

Figure 7:
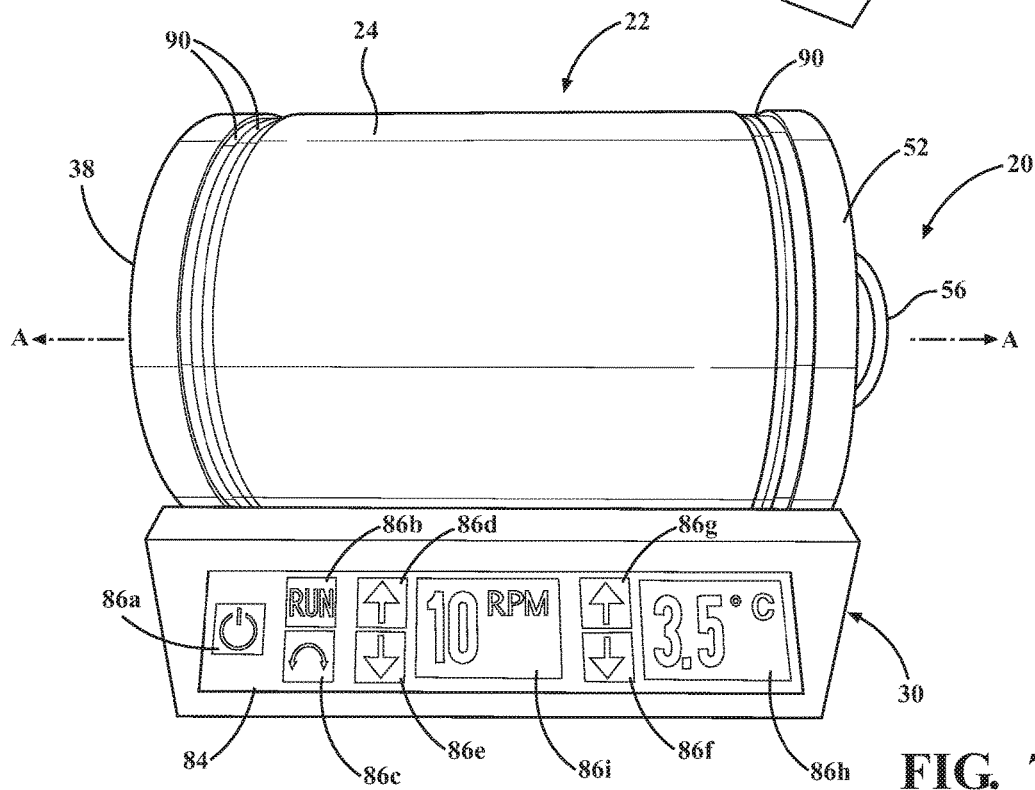
FIG. 7 is a perspective front view of the apparatus according to another embodiment.

As shown in FIG. 7, for example, the base unit 30 further comprises an electronic user interface 84. The electronic user interface 84 is configured to allow operator selective control of the apparatus 20. In one embodiment, the electronic user interface 84 is provided on a side of the base unit 30. This electronic user interface 84 may be an electronic device comprising buttons/knobs and a display unit, such as a digital screen. The electronic user interface 84 may comprise a plurality of buttons 86 to enable control selections to be made by the operator. The electronic user interface 84 is in communication with the controller 34 via any suitable hardware and/or software implementations. The buttons 86 may be physical tactile buttons implemented via hardware or may be software implemented in any suitable GUI or the like. Examples of the buttons 86 include, but are not limited to a power on/off button 86*a*, a cycle RUN button 86*b*, a cycle repeat button 86*c*, a rotational frequency increase button 86*d*, a rotational frequency decrease button 86*e*, a temperature increase button 86*f*, and a temperature decrease button 86*g*. One or more buttons 86 may be provided for any other function of the apparatus 20. The interface 84 may digitally display the operating temperature on a temperature display 86*h* and rotational frequency display 86*i*, whether the same is selected or not. Those skilled in the art appreciate that the electronic user interface 84 and buttons 86 may have other configurations and designs other than shown in the figures and described herein.

The electronic user interface 84 may provide any suitable temperature set point control. In one embodiment, the temperature set point control may be uni-directional. Uni-directional control means that the heat pump 40 is controlled only for one of cooling and heating the barrel 22. The user can specify how cold/hot the contents of the barrel 22 should become.

Alternatively or additionally, the temperature set point control may be bi-directional wherein the controller 34 commands cooling and heating the contents of the barrel 22 depending on the temperature set point and the measured content temperature. In other words, bi-directional control means that the heat pump 40 is controlled for both cooling and heating the barrel 22. This modification may require an H-bridge styled device instead of a solid-state switch that supplies power to the heat pump 40. With an H-bridge styled device, the polarity of the electrical signals supplied to the heat pump 40 can be swapped, thus changing the direction of heat pumped. Such embodiments may also require different circuitry to the input circuitry of the temperature sensor 50 which may share contact with the heat pump 40. Additionally, any suitable software modifications may be made to implement the same. For this embodiment, when in heating mode, the heat pump 40 may simultaneously provide heat in two different ways. The first way is the heat that is pumped from the ambient environment to the contents of the barrel 22 and the second way is the heat generated due to the ohmic heating of the heat pump 40. This modification lends itself well to applications other than food preparation, such as medical or chemical laboratories that must mix substances at prescribed temperatures.

In some embodiments, the apparatus 20 may be controlled via a remote control which is operable by the user of the apparatus 20 and in wireless communication with the apparatus 20 generally, and more specifically, any of the base unit 30, controller 34, and/or barrel 22, for controlling features of the same.

VI. Electrical Energy Transmission

As described above, the base unit 30 is electrically coupled to the barrel 22. The base unit 30 is configured to transfer and receive electrical energy (for power transmission) or electrical signals (for data transmission) to and from the barrel 22. For example, the base unit 30 provides electrical energy to the barrel 22 to energize the thermoelectric heat pump 40 and receives electrical signals from the temperature sensor 50 in the barrel 22. Such coupling is not trivial because the barrel 22 is detachable from the base unit 30 and freely rotates thereon as described above. In other words, it is desirable to maintain such electrical coupling to between the base unit 30 and the thermoelectric heat pump 40 and temperature sensor 50 even while the barrel 22 rotates. Coupling techniques to accomplish this are provide in detail below.

In one embodiment, as shown in FIGS. 3 and 5, the barrel 22 comprises a plurality of rings 90 disposed axially along the barrel 22. Specifically, each ring 90 is electrically conductive and extends circumferentially along the exterior surface 24 of the barrel 22. The rings 90 complete a full circle around the circumference of the barrel 22. The rings 90 are preferably axially spaced apart form one another such that electrical interference or shorting is avoided between rings 90. In one embodiment, the rings 90 are further defined as slip-rings, which fit into grooves defined axially into the exterior surface 24 of the barrel 22. However, the rings 90 may have any other suitable configuration and may be separate attached to or integrated into the barrel 22.

The rings 90 are connected to the thermoelectric heat pump 40 and temperature sensor 50. The rings 90 facilitate electrical coupling between the base unit 30 and the thermoelectric heat pump 40 and temperature sensor 50 in the barrel 22. Specifically, the base unit 30 may comprise at least one contact 92 that maintains electrical contact with at least one of the rings 90 on the barrel 22 when the barrel 22 is disposed on the base unit 30. Specifically, the one or more contacts 92 physically contact the one or more rings 90 whether the barrel 22 is stationary or rotating on the base unit 30.

In one embodiment, the contacts 92 are provided on or by the rotational members 76 of the base unit 30. As such, the rotational members 76 are preferably disposed such that they align with the rings 90 when the barrel 22 is disposed on the base unit 30. Thus, when the barrel 22 rotates, the rotational members 76 serve the dual-purpose of mechanically rotating the barrel 22 via the drive motor 32 and providing slidable electrical connection to the barrel 22 via the rings 90. In one example, each rotational member 76 and the corresponding pins 82 may be comprised of conductive material to facilitate electrical transmission therethrough. Alternatively, each contact 92 may be defined along the surface of the rotational member 76 that slidably abuts the barrel 22. In either case, the rotational members 76 may operate as slip-ring followers. The base unit 30 may comprise any suitable conductive means on the members which support the rotational members 76 and/or pins 82 to allow rotational electrical contact.

Furthermore, the axial position of the rings 90 may be symmetrical such that the barrel 22 may make appropriate contact regardless of the orientation of the barrel 22 when disposed on the base unit 30. Alternatively, the rings 90 may be located in non-symmetric positions so as to ensure that the barrel 22 is disposed in only one desired orientation to ensure proper electrical connection.

The contacts 92 are electrically connected to the controller 34. Specifically, the controller 34 may be wired directly or indirectly to the contacts 92. The controller 34 is configured to transfer electrical energy through the one or more contacts 92 to at least one of the rings 90 and to receive electrical energy from at least one of the rings 90 through the one or more contacts 92.

In one specific, yet non-limiting example, as shown in FIG. 5, the barrel 22 is configured with three rings 90*a*, 90*b*, 90*c*. One ring 90*a* is dedicated for energizing the thermoelectric heat pump 40. One ring 90*b* is dedicated for the temperature sensor 50. One ring 90c is shared among the thermoelectric heat pump 40 and the temperature sensor 50. For example, ring 90c may provide a common ground (GND) return path for the thermoelectric heat pump 40 and the temperature sensor 50 back to the controller 34. The common ground may be provided to conserve material and reduce cost. In alternative embodiments, it is possible for the thermoelectric heat pump 40 and the temperature sensor 50 to share one of the rings 90 for purposes other than ground return. For example, any one or more of the rings 90 shared by the temperature sensor 50 may alternatively be used to transfer energy to the thermoelectric heat pump 40.

Electrical wires 94 are connected between the rings 90a, 90b, 90c, and the thermoelectric heat pump 40 and the temperature sensor 50. Generally, only one wire 94 connects to each ring 90a, 90b, 90c. These wires 94 may extend through the exterior surface 24 and may be disposed along the inside of the exterior surface 24 or along the interior layer 26. For example, the wires 94 may be on a side of the interior layer 26 that faces the interior volume 28 or the opposing side of the interior layer 26 that faces the exterior surface 24. Alternatively or additionally, the wires 94 may be routed through the intermediate layer 66 when provided. The wires 94 may be routed according to ay suitable path depending on the respective locations of the thermoelectric heat pump 40 and the temperature sensor 50.

Those skilled in the art appreciate that the rings 90 and wires 94 may have other configurations other than shown in the figures and described herein. Moreover, any suitable number of rings 90 and wires 94 may be utilized depending on the number of thermoelectric heat pumps 40 and the temperature sensors 50 utilized by the barrel 22.

In the embodiment described above, the base unit 30 provides electrical energy for power transmission or data transmission to the barrel 22 through direct (abutting) electrical contact between, for example, the contacts 92 and the rings 90. However, it is to be appreciated that the base unit 30 may be configured to wirelessly transfer/receive electrical energy for power transmission to/from the barrel 22, and vice-versa. Similarly, the base unit 30 may be configured to contactlessly transfer/receive data to/from the barrel 22 (and vice-versa) via electrical signals that are wirelessly transmitted/received. Such configurations may be a substitute for or may supplement direct and abutting electrical contact between the base unit 30 and the barrel 22 for power or data transmission, as described in the embodiments above.

One embodiment of contactless power transmission is implemented via electric induction. In one example, the base unit 30 may comprise a first coil of wires (primary coil) that are connected to the controller 34. The primary coil generally has a planar configuration. The primary coil is disposed such that a major plane of the coil is parallel to and faces the base 38 of the barrel 22. The barrel 22, on the other hand, comprises a second coil of wires (secondary coil) having a similar configuration as the primary coil and being disposed such that major plane of the secondary coil is parallel to and faces the primary coil on the base unit 30. The base unit 30 supplies the primary coil with AC power to induce a magnetic field onto the secondary coil and supply the barrel 22 with electrical power. Such magnetic field induction would be maintained between the coils during rotation of the barrel 22 because of the parallel placement of the coils. The base unit 30 may comprise any suitable structure for supporting the primary coil. The barrel 22 may comprise any suitable electronics to rectify the AC power and to communicate with the base unit 30.

In examples where contactless power transmission is implemented between the base unit 30 and the barrel 22, any suitable technique may be used to control the thermoelectric heat pump 40. For example, the controller 34 in the barrel 22 (if present) may be configured to control the thermoelectric heat pump 40, as described above. In other embodiments, the frequency and/or amplitude of the AC power delivered by the base unit 30 may be altered as a means to transfer data to the barrel 22. In yet another example, the barrel 22 may communicate information back to the base unit 30 by back-transmitting data from the secondary coil to the primary coil at a significantly different frequency.

As described, signals may be transmitted wirelessly between the barrel 22 and the base unit 30. In one example, signals generally refer to electrical signals comprising information for data purposes. In such examples, signals from the barrel 22 primarily comprise temperature sensor 50 signals. Such signals are transmitted from the barrel 22 to the base unit 30 using a non-contact method. In one example, this may be accomplished via radio frequency (RF) signals. For example, the base unit 30 and the barrel 22 may be equipped with any suitable component for transmitting/receiving RF signals, such as RF transmitters, receivers, transceivers, transponders, beacons, or the like. The signals and/or data may be transmitted over a wireless radio link, such as a radio modem, or the like. In another example, wireless signals may be transmitted/received using laser/infrared temperature sensing. For example, an infrared temperature sensor may be located in the base unit 30 to sense any suitable heated parts of the barrel 22 such as the rings 90, heat sinks 46, or the like, to determine the temperature. The controller 34 may be configured to measure the outer temperature of any such suitable part and to measure a voltage and/or current of the thermoelectric heat pump 40 and analyze the same for determining or inferring a temperature of the interior volume 28. In yet another example, communication may be implemented via imaging means, such as photodiode imaging or the like. For instance, the barrel 22 may be equipped with a visual indicator, such as an LED indictor. The visual indicator may have a variable intensity depending on control from the controller 34 in the barrel 22. For example, the controller 34 may control intensity of the visual indicator depending on the temperature sensed by the temperature sensor 50. The base unit 30 may comprise any suitable imaging device, such as a camera, photo-diode, or the like. The imaging device is directed to read the intensity of the visual indictor on the barrel 22. The visual indictor and imaging device may be positioned at any suitable location of the barrel 22 and base unit 30, respectively. The controller 34 in the base unit 30 may be coupled to the imaging device to receive the signals captured by the imaging device for making determinations about the conditions of the barrel 22 or components therein for control purposes.

Those skilled in the art appreciate that wireless or contactless connection or communication between the base unit 30 and the barrel 22 may be implemented according to other embodiments not specifically described herein. Additionally, the base unit 30 and the barrel 22 may comprise any suitable additional components or software for implementing any embodiment of wireless or contactless connection or communication. Furthermore, any suitable type of current, signals, and/or data may be transmitted between the base unit 30 and barrel 22.

VII. Cooling Fan

As described above, the barrel 22 may be equipped with the heat sink 46 that may be implemented as any one or more of the layers of the barrel 22 and/or as a separate heat sink 46 unit. In either instance, the apparatus 20 may further comprise a blower motor or cooling fan 96 being configured to actively blow ambient air on to the heat sink 46, as shown in FIG. 6. The ambient air facilitates efficient dissipation of heat from the heat sink 46. Generally, the primary purpose of blowing ambient air on the heat sink 46 is to dissipate heat from the heat sink 46 in situations where the barrel 22 is being cooled, in which case the heat from inside the barrel 22 is transferred to the heat sink 46. In one embodiment, as shown in FIG. 6, the fan 96 is coupled to and/or disposed in the base unit 30. The base unit 30 may comprise apertures defined into the housing of the base unit 30 for pulling in air to provide for the fan 96. The apertures may be defined in a conspicuous location, such as the bottom of the base unit 30 to provide an aesthetically appealing appearance for the base unit 30.

The fan 96 may be driven by any suitable motor, such as a blower motor. The fan 96 may comprise any suitable blades to force air in the desired direction. The base unit 30 may comprise any suitable number of fans 96. The fan 96 may have any suitable configuration such as an axial-rotational or centrifugal configuration. The fan 96 may also be referred to as a blower. The fan 96 may have any suitable dimension for cooling the heat sink 46. In one embodiment, the fan 96 has a diameter between 40-200 mm. Additionally, the fan 96, in rotational configurations, may exhibit any suitable rotational speed, such as between 10,000-20,000 revolutions per minute. Furthermore, the fans 96 may be disposed at any suitable location on the base unit 30 for adequately directing the flow of ambient air on to the heat sink 46.

The fan 96 is connected to the controller 34 such that the controller 34 manages operation of the fan 96. For example, the controller 34 commands the fan 96 to pass ambient air across the heated one of the sides 42, 44 of the thermoelectric heat pump 40 thereby removing heat thereon. The controller 34 may control the fan 96 to control the heat-pumping characteristics of the thermoelectric heat pump 40. The controller 34 may do so according to predetermined algorithms programmed into the controller 34 or according to user selections via the electronic user interface 84. For example, the fan 96 may be controlled depending on the temperature of the barrel 22 as measured by the temperature sensor 50.

In configurations where the heat sink 46 is a separate unit disposed at the base 38 of the barrel 22, such as shown in FIG. 1 the fan 96 may be disposed on the base unit 30 but spaced away from the cavity 72 where the barrel 22 is placed. For example, the base unit 30 may comprise a platform 98 that extends from one end of the base unit 30 to form a blower module, as shown in FIG. 1. The fan 96 may be integrated into the platform 98, as shown in FIG. 1. This allows the fan 96 to be positioned to direct air at the base 38 of the barrel 22. In one embodiment, the base unit 30 comprises a tube 100 disposed around the fan 96 to more accurately direct the ambient air. As shown, in one example, the tube 100 is angled to face the position of the heat sink 46 unit when the barrel 22 is disposed on the base unit 30. Of course, if the heat sink unit 46 is disposed elsewhere other than the base 38, the base unit 30 may provide the fan 96 at different locations other than as shown and as described.

In other embodiments, such as those where the exterior surface 24 is configured as the heat sink 46, such as shown in FIG. 7, the fan 96 may have alternative configurations. Specifically, a different fan 96 configuration is more suitable because the exterior surface 24 exhibits a much larger surface area than the heat sink 46 unit and because the exterior surface 24 area changes position during rotation. In one example, as shown in FIG. 9, the fan 96 is integrated into the base unit 30 and expels air through the upper face 68 of the base unit 30. As such, the fan 96 directs air directly into the region of the cavity 72 where the barrel 22, and more specifically, the exterior surface 24 is exposed. The upper face 68 may define one or more additional openings 74' for the fan 96. The openings 74' for the fan 96 may be elongated along the length of the base unit 30 (or cavity 72) to maximize air flow the exterior surface 24 area. The openings 74' may be defined axially along the upper face 68 such that the openings 74' are also formed across the peaked portions 70a, 70b of the base unit 30. A separate fan 96 may be employed for each opening 74' or one fan 96 may expel air through more than one opening 74'. With this configuration, the base unit 30 is provided with a more compact design than the embodiment described above because the platform 98 and tube 100 are generally not needed. Instead, the fan 96 and the respective components driving the same may be disposed in a unit at the bottom of the base unit 30 as shown in FIG. 8, for example.

Those skilled in the art appreciate that the fan 96 may have any other suitable configuration other than described herein and shown in the figures depending on various factors, such as the configuration or type of the heat sink 46, the number of heat sinks 46, the location of the heat sink 46, and the like.

VIII. Control System and Circuitry

Figure 17:
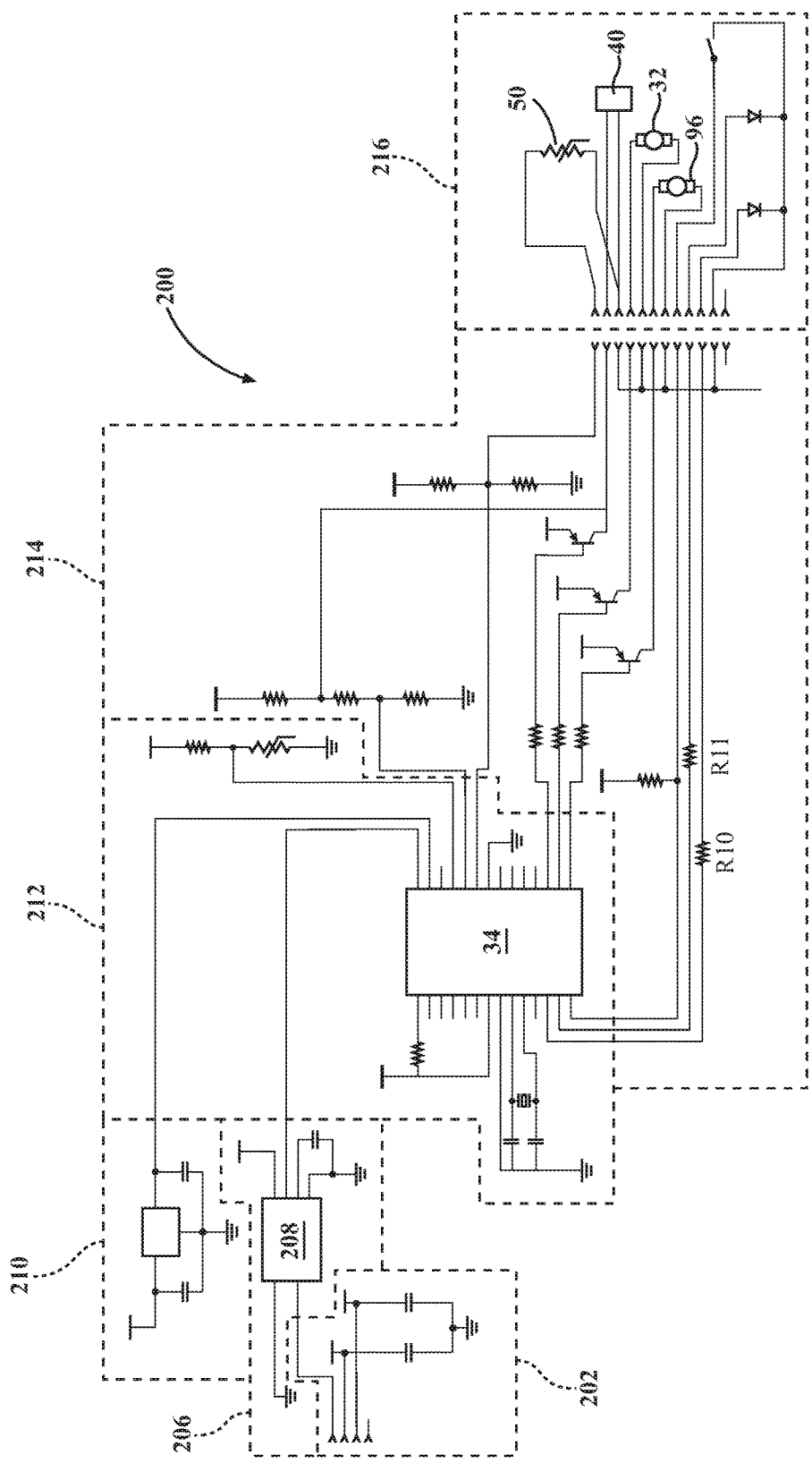
FIG. 17 is a schematic of a control system of the apparatus according to one embodiment.

FIG. 17 illustrates an electrical schematic of one example of control system 200 of the apparatus 20. Various embodiments, parameters, characteristics, circuits, functions and implementations of the system controls and electrical distribution systems of the apparatus 20 are described herein. Depending on the configuration, any of the components and functions described in this section may be implemented by the barrel 22 alone, the base unit 30 alone, or by a combination of the barrel 22 and base unit 30.

The apparatus 20 receives power from a power supply and is configured to provide conditioning to the received power. The apparatus 20 may comprise a power supply unit (PSU) to convert electrical AC voltage (100-250 VAC, 45-65 Hz) to usable DC voltage. The apparatus 20 may operate on any suitable DC voltage level, such as a 5 VDC, 12 VDC, a combination of both, and the like. The PSU is configured to supply the apparatus 20 with the electrical needs at all the necessary voltages. The PSU may be internal to the base unit 30 or may be an external unit plugged directly at the electrical outlet.

The apparatus 20 is a highly controlled and regulated system and provides numerous system controls. The controller 34 operates as the "brain" of the apparatus 20 and may have any suitable configuration. In one example, the controller 34 is an 8-bit type, such as an Atmel® Atmega328 microcontroller. However, any other suitable microcontroller can be used. In one embodiment, the controller 34 may also be a processor being configured to execute software program instructions embodied in a computer-readable medium, such as any suitable memory device. The controller 34 samples the apparatus 20 voltages to ensure that the apparatus 20 is properly powered. A current-measuring device is provided to measure the overall electrical current draw of the apparatus 20. This current-measuring device is used for control and safety purposes and the output of this device is fed to the controller 34.

Figure 18:
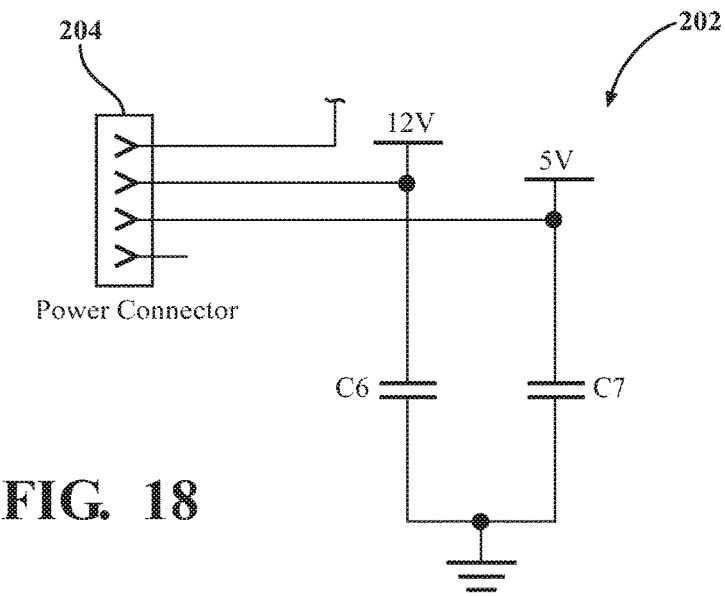
FIG. 18 is a schematic of a power supply connection portion of the control system schematic of FIG. 17.

The control system 200 comprises connections to the wiring harness, which may connect modular parts of the base unit 30 and various sensors/loads located on both the base unit 30 and the barrel 22. As best shown in FIG. 18, the control system 200 comprises a power supply connection portion 202. Here, a connector 204 to the external PSU is shown. Capacitors C6 and C7 are connected to the 12 VDC and 5 VDC lines to ensure clean power supply. The capacitors C6, C7 may have any suitable value, such as 10 µF, or the like. Four pins of the connector 204 are provided; (1) GND return to PSU; (2) 12 VDC from PSU; (3) 5 VDC from PSU; and (4) N.C. Of course, the power supply connection portion 202 may have any other suitable configuration other than described herein.

Figure 19:
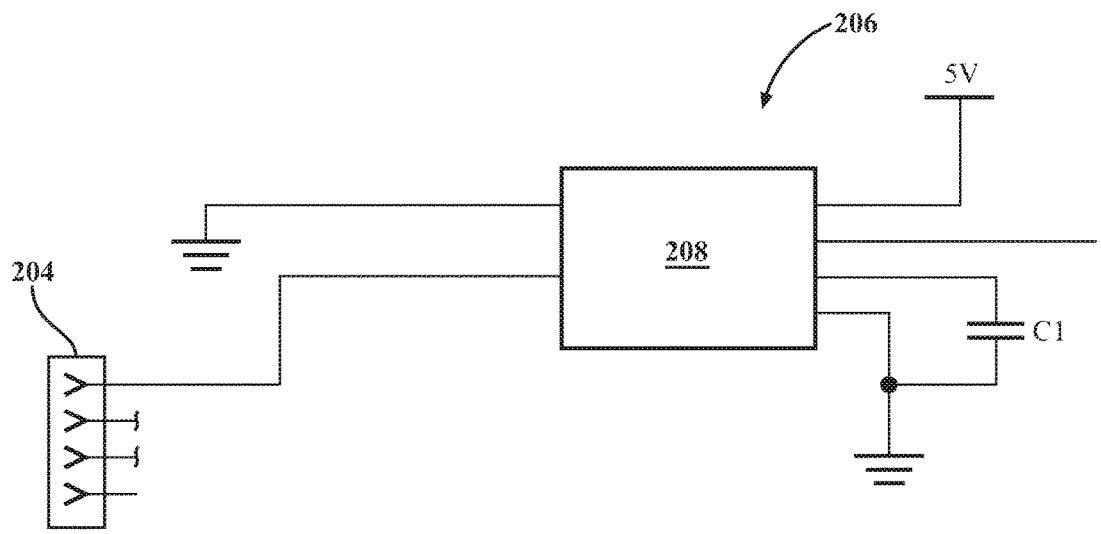
FIG. 19 is a schematic of a current measurement portion of the control system schematic of FIG. 17.

At 206 in FIG. 19, the control system 200 comprises a current measurement circuit. All ground circuits are routed through the current measurement portion 206 so that a current sensor 208 can measure parameters of the ground circuit currents. Thereafter, the ground circuit currents are sent back to the PSU through the connector 204. This way, all circuits (regardless of 5 VDC or 12 VDC operation) contribute to the electrical current measurement. The electrical current sensor is used to measure all of the currents that flow back from all the components to the PSU. The returns are used as a means by which to sample all currents using a single sensor. During all modes of operation, the electrical current draw of every component should be accounted for. If the sensor detects deviations from expected current flows, then a diagnostic fault is set. The current sensor may have any suitable configuration and may be connected to any suitable components for implementing the aforementioned functions. The current measurement portion 206 may have any other suitable configuration other than described herein.

Figure 20:
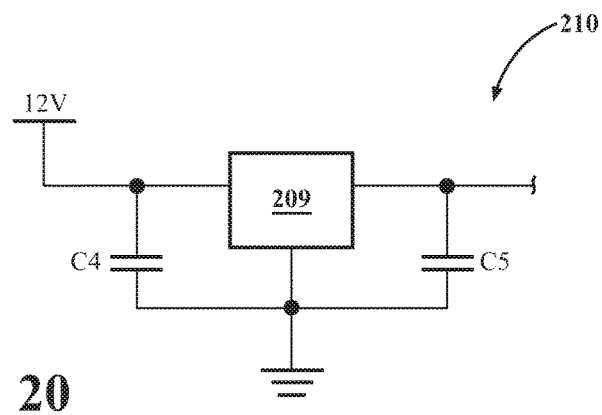
FIG. 20 is a schematic of a reference voltage generator circuit of the control system schematic of FIG. 17.

At 210 in FIG. 20, the control system 200 comprises a reference voltage generator circuit. The reference voltage generator circuit 210 generates a 'known' voltage that can be trusted. In other words, the voltage generated is low enough where a low dropout regulator (LDO) 209 can reliably generate a constant voltage from varying higher-voltages. The LDO 209 includes an output which is sampled by the controller 34 to provide an analog reference signal. The purpose of the LDO 209 is to supply a 'known' voltage that is reliable. When the controller 34 reads the output of the LDO 209, it should read the specified voltage of the LDO 209, e.g., 3.3 VDC. If the controller 34 reads more or less than this expected value, then the controller 34 may determine that the PSU is not correctly providing the necessary electrical supplies. In such instances, the controller 34 may prevent the operation of the apparatus 20. In one embodiment, the voltage regulator is connected to capacitor C4 at its input and C5 at its output. The capacitors C4, C5 are connected to ground. The reference voltage generator circuit 210 may have any suitable configuration and may be connected to any suitable components for implementing the aforementioned functions. The reference voltage generator circuit 210 may have any other suitable configuration other than described herein.

Figure 21:
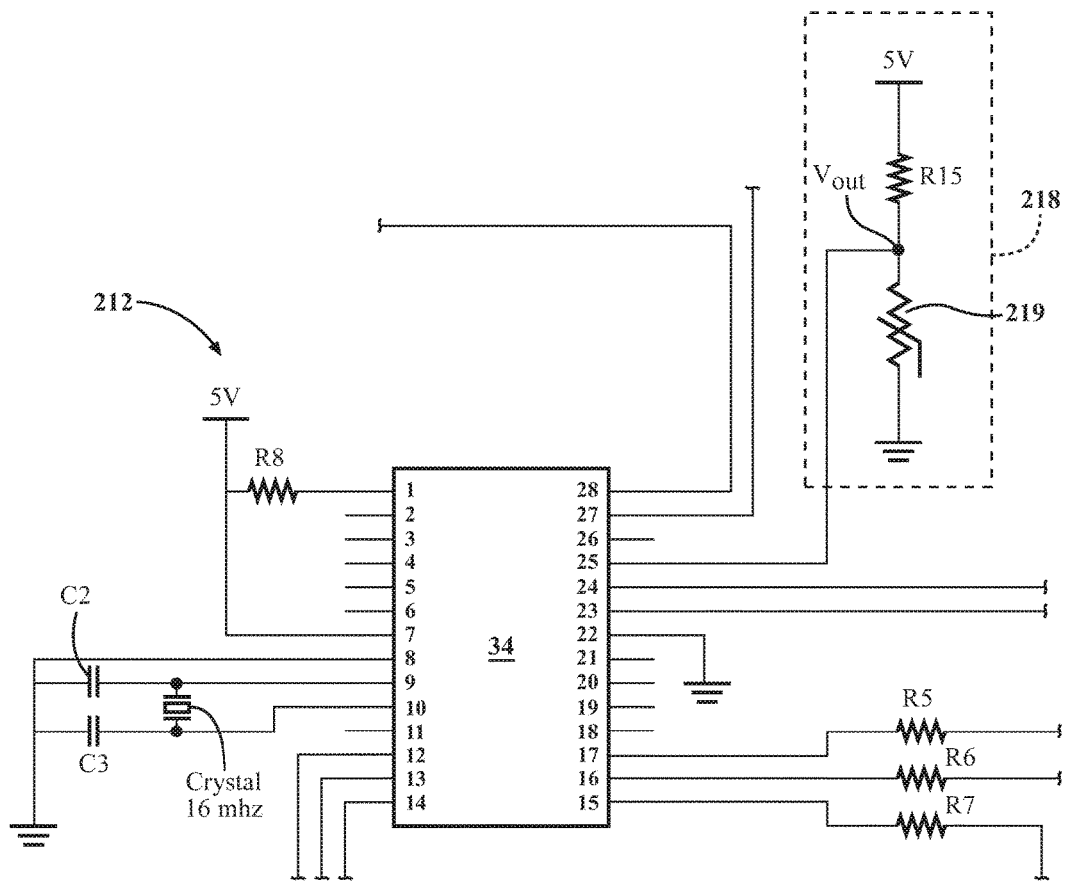
FIG. 21 is a schematic of a controller portion of the control system schematic of FIG. 17.

In general, the sensors and actuators described herein are measured or controlled via the controller 32. The controller portion 32 is shown at 212 in FIG. 21. In one example, the controller 32 is a 28-pin device. The pin descriptions below may be based on suitable open source platform labeling. Additionally, any suitable number of pins may be used and not used. Less than all of the pins may be used. Also, functions for each pin other than those provided below may be provided by the controller 34 depending on the configuration. Shown in the schematics are the 16 MHz clock and the respective capacitors. This is done to ensure accurate time measurements of the controller 32. For example, as shown, the pins have the following identification and function: (1) Reset—Reset Chip; (7) Power Supply (Vcc)—5 VDC Supply; (8) GND; (9) Crystal—16 MHz Crystal; (10) Crystal—16 MHz Crystal; (12) Digital I/O (PWM)-Output—LED; (13) Digital I/O-Output—LED; (14) Digital I/O-Input—User RUN Button; (15) Digital I/O (PWM) Output—Fan Motor Control; (16) Digital I/O (PWM)-Output—Drive Motor Control; (17) Digital I/O (PWM) (MOSI)-Output—TEC Control; (22) GND; (23) Analog Input—TEC Control Voltage; (24) Analog Input—Barrel Temp Sensor; (25) Analog Input—Board Temp Sensor; (27) Analog Input (SDA) Input—3.3 VDC Reference; and (28) Analog Input (SCL) Input—System Current Sensor.

Figure 22:
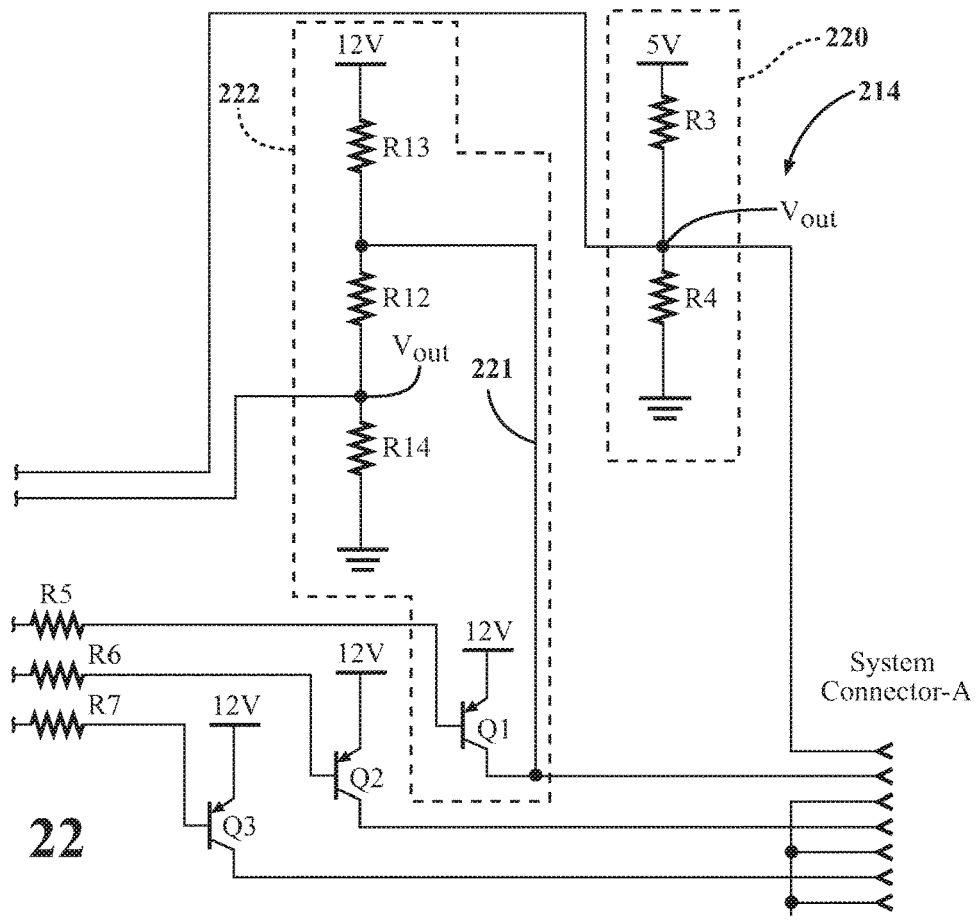
FIG. 22 is a schematic of a resistor network and driver circuit portion of the control system schematic of FIG. 17

At 214 in FIG. 22, the control system 200 comprises a resistor network and driver circuit portion 214. Resistor networks are provided that measure the barrel 22 temperature and thermoelectric heat pump 40 voltages. Electrical switches Q1, Q2, Q3 power the heat pump 40, blower-motor 96, and motor-driver 32. These output circuits may be driven at different voltages and draw different amount of electrical current. The apparatus 20 may comprise any suitable electrical distribution system. The controller 34 may control electrical switches that power the thermoelectric heat pump 40, drive motor 32, and fan 96. These switches can be any suitable transistor-type switches, such as BJTs, FETs, MOSFETs, IGBTs, etc. Such switches are located on the PCB in the base unit 30 alongside the controller 34 and other electronic components.

The thermoelectric heat pump 40, drive motor 32, and fan 96 are high-side driven, DC powered items. In such examples, each unit is coupled to a pair of wires that need to be powered to drive each unit. Since these units are all high-side driven, the low-side lines are connected to GND, either through a continuous wire or through a slip ring. The high-side lines are connected to solid state switches Q1, Q2, Q3. When these switches Q1, Q2, Q3 are not commanded on by the controller 34, the switches Q1, Q2, Q3 will not connect the associated device to 12 VDC and the device will not be powered. When the controller 34 commands a switch on, the associated device will now be supplied with 12 VDC and GND, thus powering the device. It is to be appreciated that the switches Q1, Q2, Q3 may be any combination of high-side and low-side drivers.

In one embodiment, the temperature sensor signal from the barrel 22 is fed through a network of electrical resistors, and the output voltage is fed to the controller 34. This network of resistors is designed such a particular voltage is measured when the barrel 22 is absent from the base unit 30. When the barrel 22 is placed on the base unit 30, a range of voltages will be measured. The measured voltage range of the temperature sensor does not encompass the voltage of the network when the barrel 22 is off the base unit 30. This is further explained below. A reference temperature sensor can be placed adjacent the controller 34 on, for example, the PCB on which the controller 34 rests. This reference temperature sensor can be used for various purposes such as measuring ambient temperature, electrical component temperature, and the like.

The thermoelectric heat pump 40 may be driven by a drive-circuit. The drive-signal of the thermoelectric heat pump 40 may also be measured through the network of resistors. Based on this signal, the network of resistors will measure on of a plurality of voltages. One voltage corresponds to when the barrel 22 is off of the base unit 30. Another voltage corresponds to when the barrel 22 is on the base unit 30, but the thermoelectric heat pump 40 is turned off. Another voltage corresponds to when the barrel 22 is on the base unit 30 and the thermoelectric heat pump 40 is turned on. The resistor network and driver circuit portion 214 may have configurations other than those illustrated in the figures and described herein.

Figure 23:
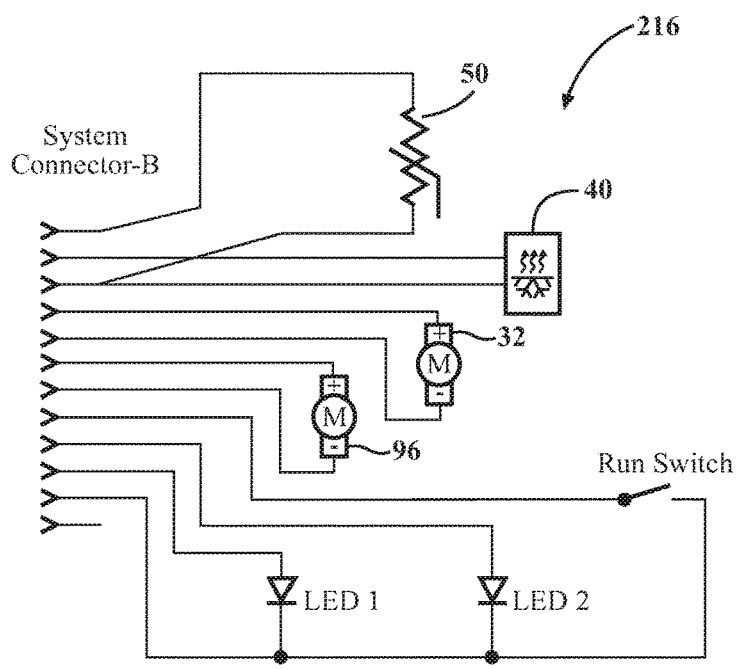
FIG. 23 is a schematic of a circuit for connected devices for the control system schematic of FIG. 17.

At 216 in FIG. 23, the control system 200 schematic illustrates other devices of the base unit 30 that may be connected internally in the base unit 30 via a connector for assembly purposes. Such components may include the fan 96, electronic user interface 84 connections, LED indicators, and the like. Although shown in the schematic, the heat pump 40 and temperature sensor 50 are not disposed in the base unit 30, but rather are disposed in the barrel 22 via any suitable configuration described herein. Resistors R10 and R11 are provided for LED indicators in the base unit 30, which are also output circuits driven by the controller 34. These LEDs are to be used to tell the user the status of the apparatus 20, including "Ready", "Running", and "Error" conditions.

The base unit 30, and more specifically, the PCB in the base unit 30 may comprise a plurality of resistor networks that create analog signals that are read by the controller 34 based on inputs from a variety of circuits, such as a board thermistor circuit 218, the barrel thermistor circuit and the heat pump 40 control measuring circuit. Additional inputs are provided from, but are not limited to the 3.3 VDC voltage reference circuit 210, the current measurement circuit 206, and the RUN button 86b on the electronic user interface 84, as shown in FIG. 7.

The user RUN button 86b is activated to inform the controller 34 that the operator wants to start/stop operation. It is normally held HIGH (5 VDC) when the button is not being pressed and toggles to GND when the user presses the button. Software interrupt and debounce logic may be provided to ensure smooth, intentional operation thereby avoiding glitching, etc.

The base unit 30 PCB comprises the board thermistor circuit 218. In one embodiment, the board thermistor circuit 218 is a voltage divider. The board thermistor circuit 218 comprises a thermistor 219 for measuring heat in the base unit 30. The output voltage of this circuit 218 may be defined as by the following equation:

$$V_{out} = V_{supply} * \left( \frac{R_{th}}{R_{th} + R_{pu}} \right) \quad [1]$$

In equation [1], $V_{supply}$=5 VDC, $R_{th}$ is the resistance of the board thermistor 219 and $R_{pu}$ is the resistance of pull-up resistor R15. The output voltage ($V_{out}$) of the board thermistor circuit 218 is read by an analog input on the controller 34. The board thermistor circuit 218 may have other configurations other than shown and described herein.

FIG. 22 shows one embodiment of a barrel thermistor circuit 220. The barrel thermistor circuit 220 includes a pull-up resistor R3 and a pull down resistor R4. The barrel thermistor circuit 220 also provides a voltage divider. The output voltage of this circuit 220 may be defined as by the following equation:

$$V_{out} = V_{supply} * \left( \frac{R_{pd}}{R_{pd} + R_{pu}} \right) \quad [2]$$

In equation [2], $V_{supply}$=5 VDC, $R_{pd}$ is the resistance of pull down resistor R4 and $R_{pu}$ is the resistance of pull-up resistor R3. The output voltage differs as a result of the barrel 22 being absent from the base unit 30. The output voltage is calculable when the barrel 22 is not on the base using the given values for R3 & R4. Of course, depending on the supply voltage and the resistor values, the output voltage may be any other suitable value.

The output voltage changes when the barrel 22 is placed on the base unit 30. When the barrel 22 is on the base unit 30, the voltage divider equation remains the same as in equation [2], except the calculation for $R_{pd}$ incorporates the barrel 22 thermistor being connected in parallel with $R_{pd}$. The equation for the output voltage in this scenario is expressed as follows:

$$V_{out} = V_{supply} * \left( \frac{R_{pd} * R_{th}}{(R_{pd} * R_{th}) + R_{pu} * (R_{pd} + R_{th})} \right) \quad [3]$$

In equation [3], VSupply=5 VDC, $R_{pd}$ is the resistance of pull down resistor R4, $R_{pu}$ is the resistance of pull-up resistor R3, and $R_{th}$ is the resistance of the barrel thermistor 50. When the barrel 22 is on the base unit 30 and contact is made between the base unit 30 and the barrel 22, via any suitable technique described herein, the voltage measured by the controller 34 will vary with respect to the detected temperature. Of course, these values may be different depending on the range of controlled temperature, configuration/type of the temperature sensor 50, and the like. When the measured voltage is within these values, it is assumed that the temperature sensor 50 is in contact/communication with the base. Another check, such as a redundancy check, may be provided to conclude that the barrel 22 is on the base 30. If the measured voltage is not in the given range, and is not at the level as prescribed in situations when the barrel 22 is off the base unit 30, then a fault is reported by the controller 34.

FIG. 22 shows a heat pump control circuit 222 comprising another resistor network. The heat pump control circuit 222 is the secondary check to ensure that the barrel 22 is on the base unit 30. Since the control electronics operate on 5 VDC and the thermoelectric heat pump 40 operates at 12 VDC, values to resistors in this resistor network are carefully selected. The measured voltages are limited such that they do not exceed the capability of the controller 34, i.e., 5 VDC. The supply voltage for the heat pump control circuit 222 is 12 VDC. The heat pump control circuit 222 comprises resistors R12-R14. The output voltage $V_{out}$ is measured at the node between R12 and R14. A sampling line 221 connects the high-side drive of the heat pump switch (transistor Q1) module with the resistor network circuit, at the node between R12 and R13. The heat pump control circuit 222 may have other embodiments, components, and component values other than those described herein and as shown.

When the barrel 22 is off the base unit 30, $V_{out}$ out of the heat pump control circuit 222 is defined by the following equation:

$$V_{out} = V_{supply} * \left( \frac{R_{Low}}{R_{Low} + R_{Med} + R_{High}} \right) \quad [4]$$

In equation [4], $V_{supply}$=12 VDC, $R_{Low}$, is the resistance of R14, $R_{med}$ is the resistance of R12, and $R_{high}$ is the resistance of R13. When the barrel 22 is off the base unit 30, the voltage of the sampling line 221 is not affected by the heat pump switch (transistor Q1 module) and is instead defined by equation [4]. Of course, the output voltage may have any other suitable value depending on the components and their respective values.

When the barrel 22 is on the base unit 30, there are generally two possible scenarios that may occur assuming no other errors. First, the thermoelectric heat pump 40 is commanded off. In this case, the GND signal of the thermoelectric heat pump 40 propagates through the thermoelectric heat pump 40 and into the sampling line 221. When this occurs, $V_{out}$ is equal to 0 mV. When the thermoelectric heat pump 40 is commanded on, $V_{out}$ may be expressed as follows in equation [5]. Those skilled in the art appreciate that equation [5] may provide a rough estimate of $V_{out}$ because $V_{TECsupply}$ may not represent the real high-end voltage of the voltage divider. As such, there may be a slight voltage-drop across the transistor (depending on the type of switch utilized) that may not be accounted for in equation [5].

$$V_{out} = V_{TECsupply} * \left(\frac{R_{Low}}{R_{Low} + R_{Med}}\right) \quad [5]$$

In equation [5], $V_{TECsupply}$ is 12 VDC, $R_{Low}$ is the resistance of R14, and $R_{med}$ is the resistance of R12.

This circuit 222 has three defined states, i.e., Barrel-Off, Barrel-On-TEC-Off, and Barrel-On-TEC-On. Each of these states generally has an expected or predetermined voltage or voltage range. If the controller 34 for any of these states does not measure the expected voltage, then an electrical fault is present and the controller 34 may be configured to shut down the output drivers.

Figure 24:
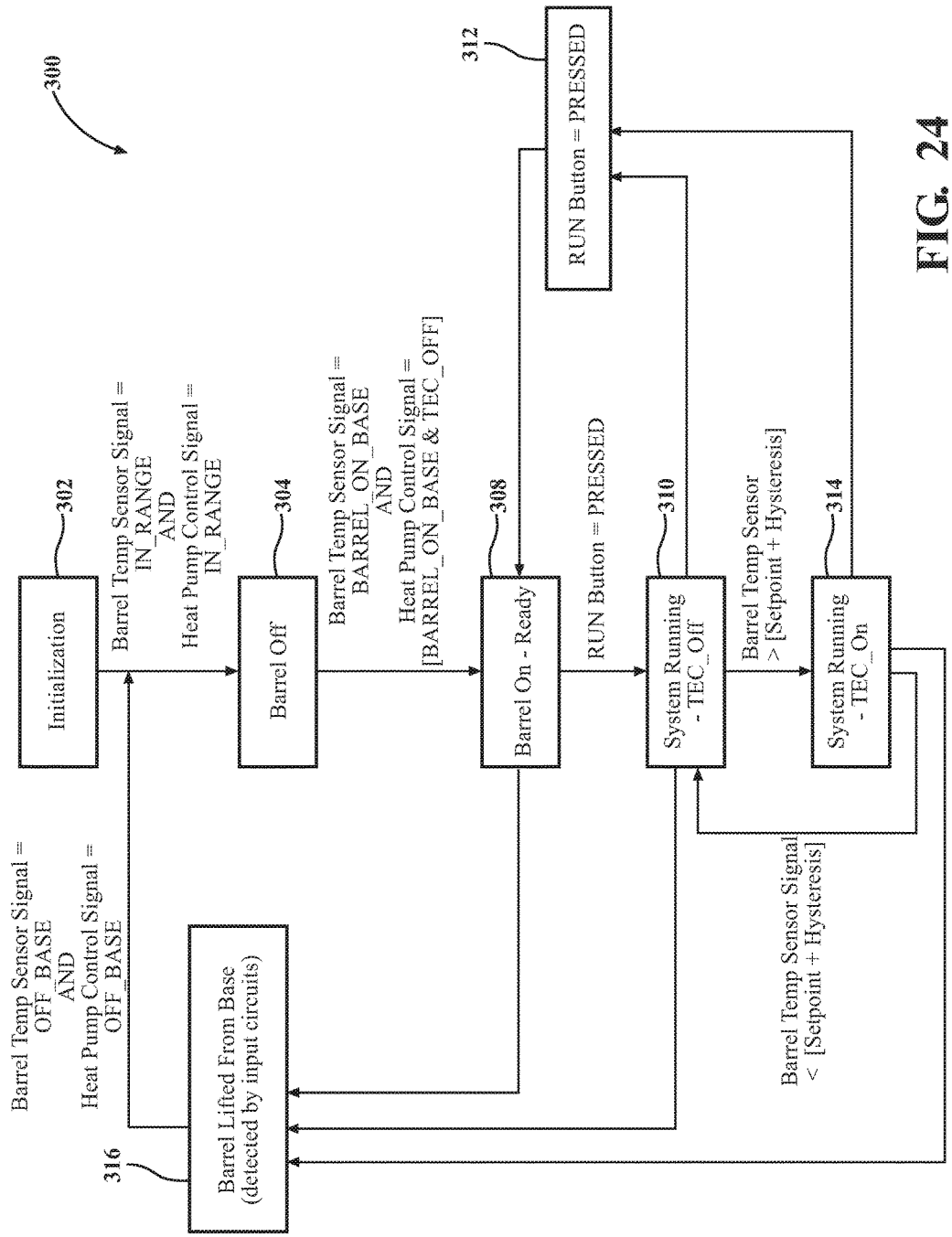
FIG. 24 is a flow chart of a control method for operating the apparatus according to one embodiment.

FIG. 24 illustrates one example of a flow chart for a method 300 of operating or controlling the apparatus 20. Control of the apparatus 20 is based on three primary inputs, i.e., the temperature sensor 50, the heat pump control circuit 222, and the RUN button. The technique that is employed to control the apparatus 20 is a state machine. At each state, inputs are measured and outputs are commanded if desired. FIG. 24 illustrates normal operation of the state machine with no diagnostic faults, etc. As will be described below, diagnostics are being run at various points while the apparatus 20 is being powered on.

At step 302, the method 300 comprises an initialization state (State: Init). This state is the default entry point of the system. In other words, when the apparatus 20 first powers-up, it start in the init state. The initialization state 302 is where the system starts upon power up. In this state, the main outputs, i.e., for the heat pump 40, drive motor 32, and fan 96 are powered off.

At step 304, the method 300 comprises the Barrel Off state. To exit state 302 and enter the Barrel Off state 304, the measured Barrel-Temperature-Signal and TEC-Control-Signal must be IN_RANGE. IN_RANGE means that the measured signals are in any "acceptable" state, regardless of barrel 22 being on/off the base unit 30. Here the measured Barrel-Temperature-Signal and TEC-Control-Signal are parked at their known positions for the barrel 22 being off. When the Barrel-Temperature-Signal measures something to indicate that the sensor 50 is connected, and the TEC-Control-Signal measures that the heat pump 40 is in contact with the base unit 30 (i.e. 0 volts), then the system progresses to Barrel_On-Ready state.

The Barrel On-Ready state is indicated at step 308. At this point, the system recognizes that the barrel is placed on the base unit and waits for the user to press the RUN button 86b. The system will remain in this state until the RUN button 86b is pressed, at which time the system enters the System_Running—TEC_Off state at step 310.

In the System_Running—TEC_Off state at step 310, the system, and more specifically, the drive motor 32, is running. This state is where the barrel 22 rotates, but the heat pump 40 is commanded OFF. The drive motor 32 will start to spin the barrel, thus mixing the contents. At this point, the system generally is not actively heating and/or cooling the barrel 22. In other words, the heat pump 40 is not activated. The system will remain in this state until the Barrel-Temperature-Signal is greater than a [setpoint+hysteresis] (i.e. the barrel contents have become warm). Hysteresis logic is added to avoid rapid on/off cycling. When the barrel contents become 'too warm', the system will transitions to a System_Running—TEC_On State at step 314.

At step 314, the method 300 comprises the System_Running—TEC_On State. This is the state where the barrel 22 rotates and the heat pump 40 is commanded ON, thus removing heat from the interior volume 28 of the barrel 22. In this state, the fan 96 is also switched on. The system will remain in this state until the Barrel-Temperature-Signal is less than a [setpoint−hysteresis]. When the barrel 22 contents become 'too cold", the system will transition back to System_Running—TEC_Off state at step 310.

There is a possibility that the barrel 22 may be intentionally or unintentionally removed from the base unit 30. The state where the barrel 22 is removed from the base unit 30 is represented by step 316. In any state, if the barrel 22 is detected as being absent from the base unit 30, the system state will be set to Barrel Off. The controller 34 detects if the barrel 22 has been lifted off the base unit 30 using the temperature sensor 50 voltage and the heat pump control circuit voltage described above. For simplicity, additional descriptions regarding removal of the barrel 22 from the base unit 30 are not repeated as such as been described above.

There are a variety of default transitions for the method 300. For example, when the system is in (i) System_Running-TEC_Off at 310 or (ii) System_Running-TEC-On at 314 and the user presses the RUN button at step 312, the system will automatically return to Barrel_On-Ready state at 308. If, at any time, the system detects that the barrel 22 has been removed from the base unit 30, as designated by step 316, the system returns to the Barrel_Off state at step 304. Those skilled in the art appreciate that the method 300 described above and as shown in FIG. 24, may be implemented according to any other suitable techniques and using other steps and states.

The apparatus 20 is configured to perform diagnostics continuously to ensure that the system is operating in a safe manner. In one example, whenever a diagnostic fault is detected, the system will immediately stop powering any of the output components (Heat pump 40/drive motor 32/fan 96) until the fault is detected as having been removed.

The apparatus 20 is configured to detect an apparent fault condition for a certain period of time before the control system decides that there is a legitimate fault using any suitable fault debouncing technique. As an example, the barrel thermistor circuit 22 may be inadvertently shorted to GND by taking a conductor and touching either end of the conductor to the rings 90 that correspond to the thermistor signal and GND. When the controller 34 measures GND for this input, the controller 34 flags a pending fault. If this fault condition exists for a pre-determined amount of time, e.g., 3 seconds or more, then the system will set a diagnostic fault. Such fault debouncing techniques remove measurement glitches.

On the other side, when in a faulted state, the system will require that a properly measured signal is detected for a pre-determined amount of time before the system will remove the fault status.

The system may comprise any suitable software and/or hardware based diagnostic checks. In one type of diagnostic technique, the controller 34 determines that in any given state an electrical input should be in a certain range. If not, then a fault is present. Tolerance bands may be used to account for component tolerances. For example, if an expected voltage from a voltage divider is 2500 mV, then the circuit diagnostic would fail if the measured voltage is greater than 2600 mV or less than 2400 mV.

Such circuit-based diagnostic techniques may be implemented in different ways for various components of the system. For example, the circuit board thermistor 219 has one specified range at which it should operate at all times. If its voltage is measured to be outside of this range, then a fault is present.

Similarly, the barrel temperature sensor 50 should operate in one of two defined states. The first state is Barrel Off state, where the measured voltage should be near a predetermined voltage. The second state that the temperature sensor 50 can be in is the Barrel On state. In this state, the measured voltage should be within a predetermined range, as described above. The respective resistor values for the temperature sensor 50 should be designed such that the measured voltages in these two states do not overlap. If the measured voltage is not within these prescribed ranges, then a fault is present.

For the heat pump 40, the heat pump control circuit 222 generally operates in one of three predefined states. The first state is Barrel Off state, where the measured voltage should be the result of the resistor network defined above. The second state is Barrel On—Heat Pump Off state, where the measured voltage should be near GND as described above. The third state is Barrel On—Heat Pump On state, where the measured voltage should be the result of the resistor network defined above. If the measured voltage is not within these prescribed ranges while the system is in the respective states, then a fault is present.

In one embodiment, the current measurement portion 206 outputs an analog voltage that is proportional to the measured current. If the output voltage from this device 206 is within predefined deadbands (or measuring a completely implausible current), then a fault is present. Alternatively or additionally, the current measurement portion 206 may output a signal proportional to the measured current.

The apparatus 20 may also comprise system diagnostics in addition to any of the above circuit-based diagnostic techniques. The system diagnostic differ from circuit diagnostics in that system diagnostics assume that all electrical diagnostics are passing. System diagnostics apply logic to determine if the measured signals correspond to a properly running system. The logic may be implemented by the controller 34.

One type of system diagnostic checks the temperature sensor 50 circuit state compared against the heat pump control circuit 222. If the barrel 22 is off the base unit 30 then both circuits 50, 222 should read "Barrel-Off". Similarly, if the barrel 22 is on the base unit 30 then both circuits should read "Barrel-On". Additionally, when the temperature sensor 50 state is barrel ON, the heat pump 40 state should be in one of its corresponding Barrel ON states (either HEAT PUMP_Off or HEAT PUMP_On). However, for instance, a fault is triggered if one of the circuits 50, 222 reads "Barrel-On" while the other circuit 50, 22 reads "Barrel-Off". In other words, there is a mis-match between the states.

Another type of system diagnostic checks measured electrical current and expected electrical current. This diagnostic looks at the measured system current and compares it to a list of known steady state currents. If there is significant deviation, then a fault is present. The controller 34 may provide any sufficient time for measuring and comparing such values to obtain a suitable sampling size before making a diagnostic decision. Mainly, having a sufficient sampling size may be appropriate because electrical loads that are switched on will have steady-state current profiles that are different from the current-draw when the apparatus 20 is first powered on. Electric motors, capacitors, etc, may exhibit this behavior. Additionally, the current-draw of the heat pump 40 varies as a function of the temperature differential between the "hot" and "cold" sides of the device. This must be taken into account when performing this diagnostic. The apparatus 20 may perform any other suitable system diagnostic check other than those described herein.

VIII. Resistive Element

In some embodiments, the barrel 22 may comprise a heating element 400 attached thereto and being energizable to transfer heat into the interior volume 28. In one embodiment, the heat pump 40 itself acts as the heating element 400. That is, the one 'hot' side 42, 44 of the heat pump 40 is also supplied with heat due to ohmic losses of the heat pump 40 itself (acting like a resistive heating element). In another example, the heating element 400 is a resistive heating element that is distinguished from the heat pump 40. In such instances, unlike the heat pump 40, which heats or cools depending on the direction of current passing therethrough, the heating element 400 heats up the interior volume 28 of the barrel 22 regardless of the current direction.

The heating element 400 may comprise any suitable resistive material and may comprise any suitable shape to extend along any path. The heating element 400 may be disposed on any layer of the barrel 22, such as any configuration described above respect to the heat pump 40. Any of the configurations and/or characteristics of the heat pump 40 with respect to the barrel 22 described above may apply to the heating element 400. Further, any of the system components, parameters, functions described above with respect to the heat pump 40 may apply to the heating element 400.

The heating element 400 may supplement the heat pump 40 in one example. In another example, the heating element 400 may substitute for the heat pump 40. In embodiments where the heating element 400 is used with the heat pump 40, current is applied in a particular direction to the barrel 22 and is shared between the heat pump 40 and the heating element. If individual control of the heat pump and heating element 400 is desired (not sharing current), additional connection means may be needed. In this case, heat is supplied to the barrel 22 from the heat pump 40 and from the electrical power dissipated by the heating element 400

It is possible to use the heat pump 40 only for cooling and the heating element 400 only for heating. To do this without adding additional electrical connections between the barrel 22 and the base unit 30, a diode 402 may be employed that only allows one of the heat pump 40 and heating element 400 to operate at once by controlling the direction of electrical current flow.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. An apparatus comprising:
a barrel having a substantially cylindrical configuration with said barrel comprising:
a first layer comprising a conductive material and defining an interior volume of said barrel;
a second layer disposed around said first layer and comprising an insulating material;
a third layer disposed around said second layer and comprising a conductive material; and
an exterior surface; and
a base unit comprising a drive motor being configured to rotate said barrel by interfacing with said exterior surface of said barrel;
wherein said barrel comprises a thermoelectric heat pump attached thereto and being controllable for at least one of transferring heat out of said interior volume and transferring heat into said interior volume.

2. The apparatus of claim 1 wherein said base unit is configured to energize said thermoelectric heat pump.

3. The apparatus of claim 1 wherein said barrel defines a plurality of rings each being conductive and extending along said exterior surface of said barrel.

4. The apparatus of claim 3 wherein said thermoelectric heat pump is electrically coupled to at least one of said rings.

5. The apparatus of claim 3 wherein said barrel comprises a temperature sensor being configured to detect a temperature within said barrel and wherein said temperature sensor is electrically coupled to at least one of said rings.

6. The apparatus of claim 3 wherein said base unit comprises one or more contacts being electrically conductive and configured to maintain electrical contact with at least one of said rings during rotation of said barrel on said base unit.

7. The apparatus of claim 6 wherein said base unit comprises a controller connected to said one or more contacts and being configured to transfer electrical energy through said one or more contacts to at least one of said rings and to receive electrical energy from at least one of said rings through said one or more contacts.

8. The apparatus of claim 1 wherein said barrel comprises a temperature sensor being configured to detect a temperature within said barrel and wherein a controller is attached to said barrel and electrically coupled to said temperature sensor and said thermoelectric heat pump.

9. The apparatus of claim 1 wherein said thermoelectric heat pump comprises a first side and an opposing second side and wherein said first side couples to said first layer and said second side couples to a heat sink attached to said second layer.

10. The apparatus of claim 1 wherein said third layer defines said exterior surface.

11. The apparatus of claim 1 wherein said thermoelectric heat pump comprises a first side and an opposing second side and wherein said thermoelectric heat pump is disposed in said second layer and wherein said first side couples to said first layer and said second side couples to said third layer.

12. The apparatus of claim 11 wherein said third layer is configured as a heat sink.

13. The apparatus of claim 1 wherein said base unit comprises an electronic user interface configured to allow selection of at least one of a temperature for said barrel and a rotational frequency of said barrel.

14. The apparatus of claim 1 wherein said barrel comprises a heat sink and wherein said base unit comprises a fan being configured to blow air on to said heat sink.

15. The apparatus of claim 1 wherein said base unit is configured to wirelessly transfer data to said barrel or wirelessly receive data from said barrel.

16. The apparatus of claim 1 wherein said base unit is configured to contactlessly transfer electrical energy to said barrel or contactlessly receive electrical energy from said barrel.

17. The apparatus of claim 1 wherein said barrel further comprises at least one agitator member coupled to said first layer configured to interact with contents within said interior volume.

18. The apparatus of claim 1 wherein said barrel further comprises at least one holder coupled to said first layer and configured to hold one or more containers within said interior volume.

19. An apparatus comprising:
a barrel having a substantially cylindrical configuration with said barrel comprising an exterior surface and defining an interior volume, and wherein said barrel comprises a plurality of rings each being conductive and extending along said exterior surface of said barrel; and
a base unit comprising a drive motor being configured to rotate said barrel by interfacing with said exterior surface of said barrel;
wherein said barrel comprises a thermoelectric heat pump attached thereto and being electrically coupled to at least one of said rings and being controllable for at least one of transferring heat out of said interior volume and transferring heat into said interior volume.

20. An apparatus comprising:
a barrel having a substantially cylindrical configuration with said barrel comprising an exterior surface and defining an interior volume, and wherein said barrel comprises a plurality of rings each being conductive and extending along said exterior surface of said barrel and a temperature sensor being configured to detect a temperature within said barrel and wherein said temperature sensor is electrically coupled to at least one of said rings; and
a base unit comprising a drive motor being configured to rotate said barrel by interfacing with said exterior surface of said barrel;
wherein said barrel comprises a thermoelectric heat pump attached thereto and being controllable for at least one of transferring heat out of said interior volume and transferring heat into said interior volume.

21. An apparatus comprising:
a barrel having a substantially cylindrical configuration with said barrel comprising an exterior surface and defining an interior volume, and wherein said barrel comprises a plurality of rings each being conductive and extending along said exterior surface of said barrel; and a base unit comprising a drive motor being configured to rotate said barrel by interfacing with said exterior surface of said barrel, wherein said base unit comprises one or more contacts being electrically conductive and configured to maintain electrical contact with at least one of said rings during rotation of said barrel on said base unit;

wherein said barrel comprises a thermoelectric heat pump attached thereto and being controllable for at least one of transferring heat out of said interior volume and transferring heat into said interior volume.

22. The apparatus of claim 21 wherein said base unit comprises a controller connected to said one or more contacts and being configured to transfer electrical energy through said one or more contacts to at least one of said rings and to receive electrical energy from at least one of said rings through said one or more contacts.

* * * * *